(12) United States Patent
Wallace et al.

(10) Patent No.: US 7,991,065 B2
(45) Date of Patent: *Aug. 2, 2011

(54) EFFICIENT COMPUTATION OF SPATIAL FILTER MATRICES FOR STEERING TRANSMIT DIVERSITY IN A MIMO COMMUNICATION SYSTEM

(75) Inventors: Mark S. Wallace, Bedford, MA (US); Jay Rodney Walton, Carlisle, MA (US); Steven J. Howard, Ashland, MA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/520,095

(22) Filed: Sep. 12, 2006

(65) Prior Publication Data

US 2007/0009059 A1    Jan. 11, 2007

Related U.S. Application Data

(63) Continuation of application No. 10/882,491, filed on Jun. 30, 2004, now Pat. No. 7,110,463.

(51) Int. Cl.
    *H04B 7/02* (2006.01)
(52) U.S. Cl. ........................................ 375/267
(58) Field of Classification Search .................. 375/260, 375/267, 299, 346, 347, 350; 370/208
    See application file for complete search history.

(56) References Cited

U.S. PATENT DOCUMENTS

| | | | |
|---|---|---|---|
| 5,581,583 A | 12/1996 | Conti et al. | |
| 5,668,837 A | 9/1997 | Dent | |
| 5,757,845 A | 5/1998 | Fukawa et al. | |
| 6,144,711 A | 11/2000 | Raleigh et al. | |
| 6,175,743 B1 | 1/2001 | Alperovich et al. | |
| 6,198,775 B1 | 3/2001 | Khayrallah et al. | |

(Continued)

FOREIGN PATENT DOCUMENTS

CN    1476695 A    2/2004

(Continued)

OTHER PUBLICATIONS

International Search Report-PCT/US2005/022840, International Search Authority, European Patent Office-Oct. 12, 2005.

(Continued)

*Primary Examiner* — Don N Vo
(74) *Attorney, Agent, or Firm* — Qualcomm Patent Group; Dmitry R. Milikovsky; James H. Yancey, Jr.

(57) ABSTRACT

Techniques for efficiently computing spatial filter matrices are described. The channel response matrices for a MIMO channel may be highly correlated if the channel is relatively static over a range of transmission spans. In this case, an initial spatial filter matrix may be derived based on one channel response matrix, and a spatial filter matrix for each transmission span may be computed based on the initial spatial filter matrix and a steering matrix used for that transmission span. The channel response matrices may be partially correlated if the MIMO channel is not static but does not change abruptly. In this case, a spatial filter matrix may be derived for one transmission span l and used to derive an initial spatial filter matrix for another transmission span m. A spatial filter matrix for transmission span m may be computed based on the initial spatial filter matrix, e.g., using an iterative procedure.

25 Claims, 7 Drawing Sheets

U.S. PATENT DOCUMENTS

| | | |
|---|---|---|
| 6,218,985 B1 | 4/2001 | Adams |
| 6,298,035 B1 | 10/2001 | Heiskala |
| 6,314,147 B1 * | 11/2001 | Liang et al. .................... 375/346 |
| 6,351,499 B1 | 2/2002 | Paulraj et al. |
| 6,441,786 B1 | 8/2002 | Jasper et al. |
| 6,452,981 B1 | 9/2002 | Raleigh et al. |
| 6,473,467 B1 | 10/2002 | Wallace et al. |
| 6,477,161 B1 | 11/2002 | Hudson et al. |
| 6,486,828 B1 | 11/2002 | Cahn et al. |
| 6,496,535 B2 | 12/2002 | Xu |
| 6,542,556 B1 | 4/2003 | Kuchi et al. |
| 6,618,454 B1 | 9/2003 | Agrawal et al. |
| 6,642,888 B2 | 11/2003 | Kishigami et al. |
| 6,678,263 B1 | 1/2004 | Hammons, Jr. et al. |
| 6,711,124 B2 | 3/2004 | Khayrallah et al. |
| 6,711,528 B2 | 3/2004 | Dishman et al. |
| 6,760,388 B2 | 7/2004 | Ketchum et al. |
| 6,763,073 B2 | 7/2004 | Foschini et al. |
| 6,788,661 B1 | 9/2004 | Ylitalo et al. |
| 6,801,790 B2 | 10/2004 | Rudrapatna |
| 6,804,307 B1 | 10/2004 | Popović |
| 6,816,555 B2 | 11/2004 | Sakoda |
| 6,842,487 B1 | 1/2005 | Larsson |
| 6,847,306 B2 | 1/2005 | Diba et al. |
| 6,862,271 B2 | 3/2005 | Medvedev et al. |
| 6,937,189 B2 | 8/2005 | Kim |
| 6,940,917 B2 | 9/2005 | Menon et al. |
| 6,956,897 B1 | 10/2005 | Honig |
| 6,975,668 B2 | 12/2005 | Zhang |
| 6,982,946 B2 | 1/2006 | Wiberg et al. |
| 6,999,472 B2 | 2/2006 | Hamalainen et al. |
| 7,020,110 B2 | 3/2006 | Walton et al. |
| 7,020,490 B2 | 3/2006 | Khatri |
| 7,031,669 B2 | 4/2006 | Vaidyanathan et al. |
| 7,057,555 B2 | 6/2006 | Lewis |
| 7,061,969 B2 | 6/2006 | Alamouti et al. |
| 7,065,156 B1 | 6/2006 | Kuchi |
| 7,079,870 B2 | 7/2006 | Vaidyanathan |
| 7,095,709 B2 | 8/2006 | Walton et al. |
| 7,095,987 B2 | 8/2006 | Brothers, Jr. et al. |
| 7,099,678 B2 | 8/2006 | Vaidyanathan |
| 7,099,698 B2 | 8/2006 | Tarokh et al. |
| 7,110,378 B2 | 9/2006 | Onggosanusi et al. |
| 7,110,463 B2 * | 9/2006 | Wallace et al. ................ 375/267 |
| 7,130,580 B2 | 10/2006 | Alexiou et al. |
| 7,149,254 B2 | 12/2006 | Sampath |
| 7,151,809 B2 | 12/2006 | Ketchum et al. |
| 7,190,734 B2 | 3/2007 | Giannakis et al. |
| 7,194,042 B2 | 3/2007 | Walton et al. |
| 7,200,631 B2 | 4/2007 | Mailaender et al. |
| 7,227,906 B2 | 6/2007 | Fukuda et al. |
| 7,292,623 B2 | 11/2007 | Reznik |
| 7,302,009 B2 | 11/2007 | Walton et al. |
| 7,317,750 B2 | 1/2008 | Shattil |
| 7,324,429 B2 | 1/2008 | Walton et al. |
| 7,324,482 B2 | 1/2008 | Hammons, Jr. et al. |
| 7,327,798 B2 | 2/2008 | Won |
| 7,336,746 B2 | 2/2008 | Walton et al. |
| 7,356,073 B2 | 4/2008 | Heikkilä |
| 7,359,466 B2 | 4/2008 | Huang et al. |
| 7,385,617 B2 | 6/2008 | Tahat |
| 7,394,754 B2 | 7/2008 | Li et al. |
| 7,436,896 B2 | 10/2008 | Hottinen et al. |
| 7,447,268 B2 | 11/2008 | Sadowsky et al. |
| 7,529,177 B2 | 5/2009 | Celebi et al. |
| 7,583,747 B1 | 9/2009 | Damen et al. |
| 7,593,317 B2 | 9/2009 | Yuda et al. |
| 2002/0114269 A1 | 8/2002 | Onggosanusi et al. |
| 2002/0127978 A1 | 9/2002 | Khatri |
| 2002/0172264 A1 | 11/2002 | Wiberg et al. |
| 2002/0193146 A1 | 12/2002 | Wallace et al. |
| 2002/0196742 A1 | 12/2002 | Baker et al. |
| 2003/0011274 A1 | 1/2003 | Saint-Michel et al. |
| 2003/0016637 A1 | 1/2003 | Khayrallah et al. |
| 2003/0072254 A1 | 4/2003 | Ma et al. |
| 2003/0076908 A1 * | 4/2003 | Huang et al. .................. 375/350 |
| 2003/0108117 A1 | 6/2003 | Ketchum et al. |
| 2003/0112745 A1 | 6/2003 | Zhuang et al. |
| 2003/0123565 A1 * | 7/2003 | Fukuda et al. ................ 375/267 |
| 2003/0123567 A1 | 7/2003 | Shigemasa et al. |
| 2003/0128658 A1 | 7/2003 | Walton et al. |
| 2003/0161282 A1 | 8/2003 | Medvedev et al. |
| 2003/0186698 A1 | 10/2003 | Holma et al. |
| 2003/0204380 A1 * | 10/2003 | Dishman et al. .............. 702/189 |
| 2003/0228850 A1 | 12/2003 | Hwang |
| 2003/0235147 A1 | 12/2003 | Walton et al. |
| 2004/0002364 A1 | 1/2004 | Trikkonen et al. |
| 2004/0022183 A1 | 2/2004 | Li et al. |
| 2004/0042439 A1 | 3/2004 | Menon et al. |
| 2004/0052315 A1 * | 3/2004 | Thielecke et al. ............. 375/299 |
| 2004/0081263 A1 | 4/2004 | Lee et al. |
| 2004/0082356 A1 | 4/2004 | Walton et al. |
| 2004/0085939 A1 | 5/2004 | Wallace et al. |
| 2004/0086027 A1 | 5/2004 | Shattil |
| 2004/0102157 A1 | 5/2004 | Lewis |
| 2004/0136349 A1 | 7/2004 | Walton et al. |
| 2004/0139137 A1 * | 7/2004 | Mailaender et al. .......... 708/502 |
| 2004/0248604 A1 | 12/2004 | Vaidyanathan |
| 2005/0017511 A1 | 1/2005 | Dalton |
| 2005/0026570 A1 | 2/2005 | Han |
| 2005/0149320 A1 * | 7/2005 | Kajala et al. .................. 704/206 |
| 2005/0175115 A1 | 8/2005 | Walton et al. |
| 2005/0180312 A1 | 8/2005 | Walton et al. |
| 2005/0195733 A1 * | 9/2005 | Walton et al. ................. 370/208 |
| 2005/0220199 A1 * | 10/2005 | Sadowsky et al. ............ 375/260 |
| 2005/0238111 A1 | 10/2005 | Wallace et al. |
| 2005/0249159 A1 * | 11/2005 | Abraham et al. ............. 370/329 |
| 2005/0249174 A1 | 11/2005 | Lundby et al. |
| 2005/0265275 A1 | 12/2005 | Howard et al. |
| 2005/0276347 A1 * | 12/2005 | Mujtaba et al. ............... 375/299 |
| 2006/0013250 A1 | 1/2006 | Howard et al. |
| 2006/0050770 A1 | 3/2006 | Wallace et al. |
| 2006/0067421 A1 | 3/2006 | Walton et al. |
| 2006/0234789 A1 * | 10/2006 | Tarokh et al. ............... 455/575.7 |
| 2006/0274844 A1 * | 12/2006 | Walton et al. ................. 375/260 |
| 2008/0031372 A1 | 2/2008 | Walton et al. |
| 2008/0031374 A1 | 2/2008 | Walton et al. |
| 2008/0095282 A1 | 4/2008 | Walton et al. |
| 2008/0273617 A1 | 11/2008 | Lundby et al. |

FOREIGN PATENT DOCUMENTS

| | | |
|---|---|---|
| EP | 0752793 A2 | 1/1997 |
| EP | 0905920 A2 | 3/1999 |
| EP | 1009124 A2 | 6/2000 |
| EP | 1073214 | 1/2001 |
| EP | 1185001 | 3/2002 |
| EP | 1220506 | 7/2002 |
| EP | 1223702 A1 | 7/2002 |
| EP | 1241824 | 9/2002 |
| EP | 1361686 | 11/2003 |
| EP | 1396956 | 3/2004 |
| JP | 11-205026 | 7/1999 |
| JP | 2002-503048 | 1/2002 |
| JP | 2002524972 | 8/2002 |
| JP | 2003530010 | 10/2003 |
| JP | 200423416 | 1/2004 |
| JP | 2004-064654 | 2/2004 |
| JP | 2004-072150 | 3/2004 |
| JP | 2004-096753 | 3/2004 |
| JP | 2004-104790 | 4/2004 |
| JP | 2005-524331 | 8/2005 |
| JP | 2007-515829 | 6/2007 |
| JP | 2007515131 | 6/2007 |
| JP | 2007-523549 | 8/2007 |
| JP | 2007-523550 | 8/2007 |
| JP | 2007527150 | 9/2007 |
| JP | 2007-529972 | 10/2007 |
| JP | 2007-538414 | 12/2007 |
| KR | 200260860 | 7/2002 |
| KR | 20060123496 | 12/2006 |
| RU | 2111619 | 5/1998 |
| RU | 2116698 | 7/1998 |
| RU | 2202152 | 4/2003 |
| WO | 9737456 | 10/1997 |
| WO | WO0156218 A1 | 2/2001 |
| WO | 01076110 | 10/2001 |
| WO | 02025857 | 3/2002 |

| | | |
|---|---|---|
| WO | 02078211 | 10/2002 |
| WO | 03015334 | 2/2003 |
| WO | 03041300 | 5/2003 |
| WO | WO03050968 | 6/2003 |
| WO | 03058871 | 7/2003 |
| WO | 03063526 | 7/2003 |
| WO | WO03056742 A1 | 7/2003 |
| WO | WO03071711 | 8/2003 |
| WO | 03094386 | 11/2003 |
| WO | 04002011 | 12/2003 |
| WO | 04002047 | 12/2003 |
| WO | WO03101029 A1 | 12/2003 |
| WO | WO2004021605 A1 | 3/2004 |
| WO | 2004038984 | 5/2004 |
| WO | 2004038985 | 5/2004 |
| WO | WO04038987 | 5/2004 |
| WO | WO2004039011 A2 | 5/2004 |
| WO | WO05060192 | 6/2005 |
| WO | 05099211 | 10/2005 |

OTHER PUBLICATIONS

Written Opinion-PCT/US2005/022840, International Search Authority, European Patent Office-Oct. 12, 2005.
International Preliminary Report on Patentability-PCT/US2005/022840, International Preliminary Examination Authority, Alexandria, Virginia, US-Apr. 13, 2006.
Agustin et al., "LDC Construction With a Defined Structure," Vehicular Technology Conference, XP010700754, Oct. 2003.
Alamouti, "A Simple Transmit Diversity Technique for Wireless Communications," IEEE Journal on Selected Areas in Communications, vol. 16, No. 8, Oct. 1998, pp. 1451-1458.
B.M Hochwald et al., "Systematic Design of Unitary Space-Time Constellations," IEEE Trans. on it,vol. 46, No. 6, Sep. 2000.
Bem et al., "Smart Antennas for Mobile Communications Systems," International Conference on Microwaves, Radar and Wireless Communications, vol. 3, May 22, 2000, pp. 120-130, XP010537479.
Bourdoux et al., "Non-reciprocal transceivers in OFDM/SDMA Systems: Impact and Mitigation," Radio and Wireless Conference, Aug. 10, 2003, pp. 183-186, XP010656728.
Bruhl et al., "Investigation of Front-end Requirements for MIMO-Systems Using Downlink Pre-Distortion," European Personal Mobile Communications Conference, 2003, pp. 472-476, XP002330243.
Crow, I.: "The Fourier Matrix," Apr. 27, 2001, http://www.maths.abdn.ac.uk/~igc/tch/mx4002/notes.node91.html, pp. 1-3.
Dammann, et al., "Beamforming in Combination with Space-Time Diversity for Broadband OFDM Systems," IEEE International Conference on Communications, 2002. ICC 2002. New York, NY, Apr. 28-May 2, 2002. vol. 1, pp. 165-171.
Jungnickel et al., "A Mimo System with Reciprocal Transceivers for the Time-division Duplex Mode," Antennas and Propagation Society International Symposium, vol. 2, Jun. 20, 2004, pp. 1267-1270, XP010721570.
Kaiser, "Spatial Transmit Diversity Techniques for Broadband OFDM Systems," IEEE Global Telecommunications Conference, 2000. GLOBECOM '00. San Francisco. CA. Nov. 27-Dec. 1, 2000, vol. 3, pp. 1824-1828.
Laroia R et al., "Enhanced Opportunistic Beamforming," Vehicular Technology Conference, 2003. VTC 2003-Fall. IEEE 58th Orlando, FL, USA Oct. 6-9, 2003, pp. 1762-1766, XP010702878.
Liu et al., "OFDM-MIMO WLAN AP Front-end Gain and Phase Mismatch Calibration," IEEE Radio and Wireless Conference, Sep. 2004, pp. 151-154, XP002330244.
Narula, et al., "Performance Limits of Coded Diversity Methods for Transmitter Antenna Arrays," IEEE Transactions on Information Theory, vol. 45, No. 7, Nov. 1999, pp. 2418-2433.
Pan, et al., "Dynamic Sub-channel Allocation with Adaptive Beamforming for Broadband OFDM Wireless Systems," IEEE Global Telecommunications Conference, 2002. GLOBECOM '02. Taipei, Taiwan, Nov. 17-21, 2002, New York, NY, Nov. 17, 2002, vol. 1, pp. 711-715.
T.L. Marzetta, B. Hassibi, B.M Hochwald, "Structured Unitary Space-Time Autocoding Constellations," IEEE Trans. on it,vol. 48, No. 4, Apr. 2002.

IEEE Std. 802.11a-1999, Part 11: Wireless LAN Medium Access Control (MAC) and Physical Layer (PHY) Specifications, Amendment 1: High-Speed Physical Layer in the 5 GHz Band.
IEEE Std. 802.11g-2003, Part 11: Wireless LAN Medium Access Control (MAC) and Physical Layer (PHY) Specifications, Amendment 4: Further Higher Data Rate Extension in the 2.4 GHz Band.
"Part 11: Wireless LAN Medium Access Control (MAC) and Physical Layer (PHY) Specifications: High-Speed Physical Layer in the 5GHz Band," IEEE Standards 802.11a, Sep. 1999.
Auer, G., Channel Estimation for OFDM With Cyclic Delay Diversity, Personal, Indoor and Mobile Radio Communications, 2004. PIMRC 2004, 15TH IEEE International Symposium on, Sep. 5, 2004, vol. 3, pp. 1792-1796.
Bauch, G. et al., Orthogonal Frequency Division Multiple Access With Cyclic Delay Diversity, Smart Antennas, 2004, ITG Workshop on, Mar. 18, 2004, pp. 17-24.
Masoud Sharif, Babak Hassibi, on the Capacity of Mimo Broadcast Channel With Partial Side Information, Signals, Systems and Computers, 2003, Conference Record of the Thirty Seventh Asilomar Conference, Nov. 12, 2003.
Winters, J. "Smart antennas for wireless systems", IEEE Personal Communications, Dec. 5, 2003, pp. 1-113.
Antenna-Theory.com "Steering Vector", http://www.antenna-theory.com, p. 1., No date given. (Cited by USPTO Examiner in U.S. Appl. No. 10/821,390 on Jan. 1, 2011.
Doonstnejad et al, "Space-time Spreading Codes for a Multiuser MIMO System, " Insistitue of Electrical and Electronics Engineers, Conference Record of the 36th. Asilomar Conference on Signals, Systems & Computers, Pacific Grove, California, Nov. 3-6, 2002, pp. 1374-1378, XP10638423.
Farrokhi et al., "Link-Optimal Space-Time Processing with Multiple Transmit and Receive Antennas, " IEEE Communications Letters, vol. 5, No. 3, pp. 85-87(2001-03).
Goldsmith et al., "Capacity limits of Mimo Channels, " IEEE Journal on Selected Areas in Communications, vol. 21, No. 5, pp. 684-702, Jun. 2003.
Hanzo et al., Single and Multi-carrier DsβCDMA, "Space-Time Spreading Aided Single-Carrier Wideband CDMA Communicating Over Multipath Nakagame Fading Channels," Chapter 8, pp. 279-310, John Wiley & Sons, England, 2003 (XP-002357231).
Hochwald et al., "A Transmitter Diversity Scheme for Wideband CDMA Systems based on Space-time Spreading", Selected Areas in Communications, vol. 19, No. 1, Jan. 2001.
Hochwald et al., "Unitary Space-Time Modulation for Multiple~Antenna Communications in Rayleigh Flat Fading, " IEEE Transactions On Information Theory, vol. 46, No. 2, pp. 543-564 (2000).
Ketchum, John, et al., "PHY Design for Spatial Multiplexing MIM WLAN, " IEEE 802. 11-04/0721r0, IEEE, Jul. 2004, pp. 1-33 (Spatial Spreading Mode, Intrinsic Transmission Mode).
Li, et al., "Transmit Diversity Over Quasi-Static Fading Channels Using Multiple Antennas And Random Signal Mapping, " IEEE Transactions On Communications, vol. 51, No. 11, Nov. 2003, pp. 1918-1926.
Liu, Jung-Tao: "Successive decoding of multiple space time coded streams in multi-input multi-output systems, " Global Telecommunications Conference, 2002, Globecom '02. IEEE, USA, Nov. 21, 2002, 1007-1011 vol. 1.
Marzetta et al., "Structured Unitary Space-Time Autocoding Constellations, " IEEE Transactions On Information Theory, vol. 48, No. 4, Apr. 2002, pp. 942-950.
Medles et al., "Multistream Space-Time Coding by Spatial Spreading, Scrambling and Delay Diversity," IEEE International Conference on Acoustics, Speech and Signal Processing, vol. 4 of 4, XP-10803892, pp.2429-2432 (2002).
Sharif et al., "On the Capacity of MIMO Broadcast Chennel with Partial Side Information", Department of Electrical Engineering, CA Institute of Engineering, IEEE 2002, pp. 958-962.

Suthahara et al., Space-Time coded MIMO-OFDM for high capacity and high date-rate wireless communication over frequency selective fading channels, Moble and Wireless Communications Networks, 2002. 4th International Workshop on, USA, Sep. 11, 2002, 424-428.

Yao, Huan, "Efficient Signal, Code, and Receiver Designs for MIMO Communication Systems," PH.D. Thesis, Massachusetts Institute of Technology, Cambridge, Massachusetts, 2003.

Yu and Cioffi, "rellis Precoding for the Broadcast Channel," IEEE Global Telecommunications Conference, vol. 2, Electrical. Engineering Department, Stanford, University, Stanford, California (2001), pp. 1344-1348.

* cited by examiner

US 7,991,065 B2

EFFICIENT COMPUTATION OF SPATIAL FILTER MATRICES FOR STEERING TRANSMIT DIVERSITY IN A MIMO COMMUNICATION SYSTEM

CLAIM OF PRIORITY UNDER 35 U.S.C. §120

The present Application for Patent is a continuation of patent application Ser. No. 10/882,491 entitled "EFFICIENT COMPUTATION OF SPATIAL FILTER MATRICES FOR STEERING TRANSMIT DIVERSITY IN A MIMO COMMUNICATION SYSTEM" filed Jun. 30, 2004, now U.S. Pat. No. 7,110,463 allowed, and assigned to the assignee hereof and hereby expressly incorporated by reference herein.

BACKGROUND

I. Field

The present invention relates generally to communication, and more specifically to spatial processing for data transmission in a multiple-input multiple-output (MIMO) communication system.

II. Background

A MIMO system employs multiple ($N_T$) transmit antennas at a transmitting entity and multiple ($N_R$) receive antennas at a receiving entity for data transmission. A MIMO channel formed by the $N_T$ transmit antennas and $N_R$ receive antennas may be decomposed into $N_S$ spatial channels, where $N_S \leq \min\{N_T, N_R\}$. The $N_S$ spatial channels may be used to transmit data in parallel to achieve higher throughput and/or redundantly to achieve greater reliability.

Each spatial channel may experience various deleterious channel conditions such as, e.g., fading, multipath, and interference effects. The $N_S$ spatial channels may also experience different channel conditions and may achieve different signal-to-noise-and-interference ratios (SNRs). The SNR of each spatial channel determines its transmission capacity, which is typically quantified by a particular data rate that may be reliably transmitted on the spatial channel. For a time variant wireless channel, the channel conditions change over time and the SNR of each spatial channel also changes over time.

To improve performance, the MIMO system may utilize some form of feedback whereby the receiving entity evaluates the spatial channels and provides feedback information indicating the channel condition or the transmission capacity of each spatial channel. The transmitting entity may then adjust the data transmission on each spatial channel based on the feedback information. However, this feedback information may not be available for various reasons. For example, the system may not support feedback transmission from the receiving entity, or the wireless channel may change more rapidly than the rate at which the receiving entity can estimate the wireless channel and/or send back the feedback information. In any case, if the transmitting entity does not know the channel condition, then it may need to transmit data at a low rate so that the data transmission can be reliably decoded by the receiving entity even with the worst-case channel condition. The performance of such a system would be dictated by the expected worst-case channel condition, which is highly undesirable.

To improve performance (e.g., when feedback information is not available), the transmitting entity may perform spatial processing such that the data transmission does not observe the worst-case channel condition for an extended period of time, as described below. A higher data rate may then be used for the data transmission. However, this spatial processing represents additional complexity for both the transmitting and receiving entities.

There is therefore a need in the art for techniques to efficiently perform spatial processing to improve performance in a MIMO system.

SUMMARY

Techniques for efficiently computing spatial filter matrices used for spatial processing by a receiving entity are described herein. A transmitting entity may transmit data via a MIMO channel using either full channel state information ("full-CSI") or "partial-CSI" transmission, as described below. The transmitting entity may also utilize steering transmit diversity (STD) for improved performance. With STD, the transmitting entity performs spatial processing with different steering matrices so that the data transmission observes an ensemble of effective channels and is not stuck on a "bad" channel realization for an extended period of time. The receiving entity performs the complementary receiver spatial processing for either full-CSI or partial-CSI transmission and for steering transmit diversity. The spatial filter matrices used for receiver spatial processing may be efficiently computed if the MIMO channel is relatively static or does not change abruptly.

If the MIMO channel is relatively static over a range of transmission spans (e.g., a range of symbol periods or frequency subbands), then the channel response matrices for the MIMO channel over these transmission spans may be highly correlated. In this case, an initial spatial filter matrix may be derived based on a channel response matrix and a selected receiver processing technique, as described below. A spatial filter matrix for each transmission span within the static range may then be computed based on the initial spatial filter matrix and the steering matrix used for that transmission span.

If the MIMO channel is not static but does not change abruptly, then the channel response matrices for different transmission spans may be partially correlated. In this case, a spatial filter matrix $M_x(l)$ may be derived for a given transmission span l and used to derive an initial spatial filter matrix for another transmission span m. A spatial filter matrix $M_x(m)$ for transmission span m may then be computed based on the initial spatial filter matrix, e.g., using an iterative procedure. The same processing may be repeated over a range of transmission spans of interest, so that each newly derived spatial filter matrix may be used to compute another spatial filter matrix for another transmission span.

The steering matrices may be defined such that the computation of the spatial filter matrices can be simplified. Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
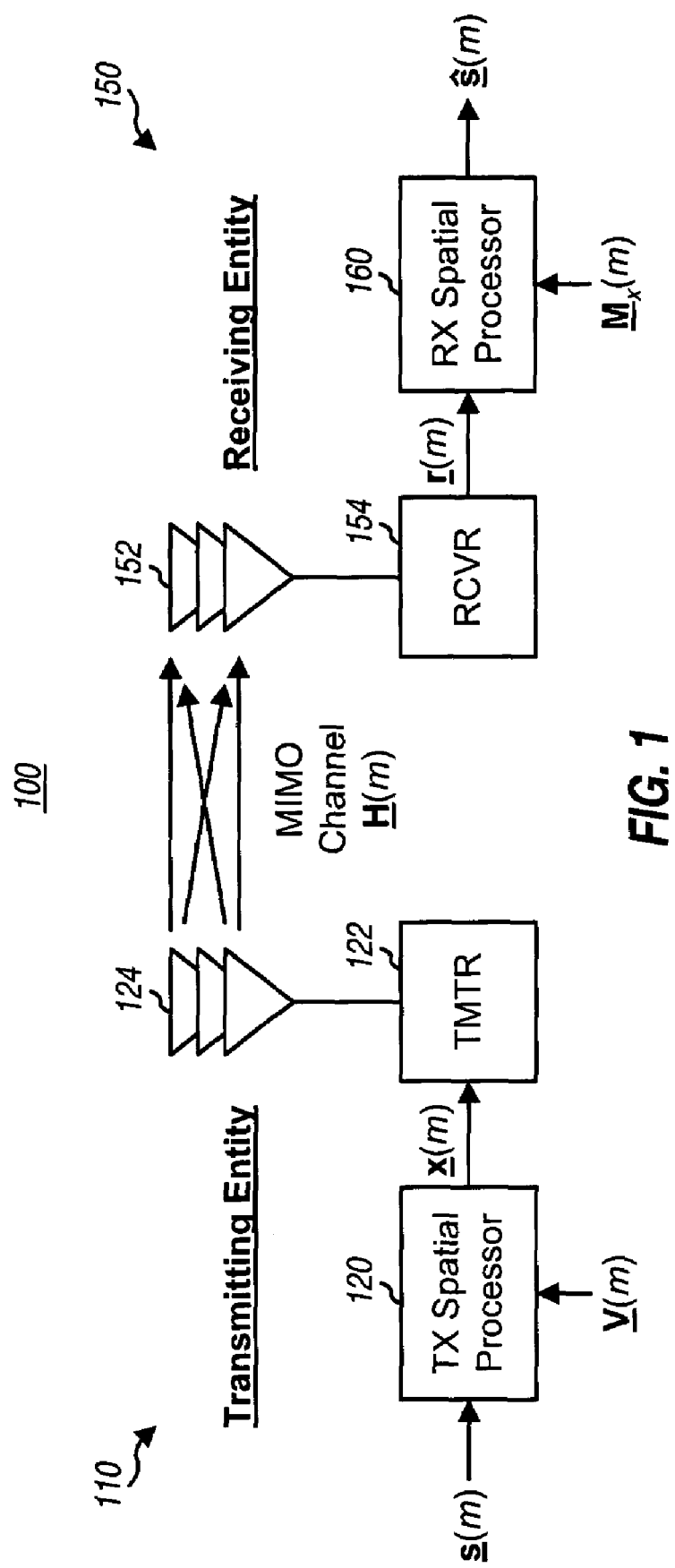
FIG. 1 shows a transmitting entity and a receiving entity in a MIMO system.

FIG. 1 shows a simple block diagram of a transmitting entity 110 and a receiving entity 150 in a MIMO system 100. At transmitting entity 110, a transmit (TX) spatial processor 120 performs spatial processing on data symbols (denoted by a vector s(m)) to generate transmit symbols (denoted by a vector x(m)). As used herein, a "data symbol" is a modulation symbol for data, a "pilot symbol" is a modulation symbol for pilot (which is data that is known a priori by both the transmitting and receiving entities), a "transmit symbol" is a symbol to be sent from a transmit antenna, a "received symbol" is a symbol obtained from a receive antenna, and a modulation symbol is a complex value for a point in a signal constellation used for a modulation scheme (e.g., M-PSK, M-QAM, and so on). The spatial processing is performed based on steering matrices V(m) and possibly other matrices. The transmit symbols are further conditioned by a transmitter unit (TMTR) 122 to generate $N_T$ modulated signals, which are transmitted from $N_T$ transmit antennas 124 and via a MIMO channel.

At receiving entity 150, the transmitted modulated signals are received by $N_R$ receive antennas 152, and the $N_R$ received signals are conditioned by a receiver unit (RCVR) 154 to obtain received symbols (denoted by a vector r(m)). A receive (RX) spatial processor 160 then performs receiver spatial processing (or spatial matched filtering) on the received symbols with spatial filter matrices (denoted by $M_x(m)$) to obtain "detected" data symbols (denoted by a vector ŝ(m)). The detected data symbols are estimates of the data symbols sent by transmitting entity 110. The spatial processing at the transmitting and receiving entities are described below.

The spatial filter matrix computation techniques described herein may be used for a single-carrier MIMO system as well as a multi-carrier MIMO system. Multiple carriers may be obtained with orthogonal frequency division multiplexing (OFDM), discrete multi tone (DMT), some other multi-carrier modulation techniques, or some other construct. OFDM effectively partitions the overall system bandwidth into multiple ($N_F$) orthogonal subbands, which are also referred to as tones, subcarriers, bins, and frequency channels. With OFDM, each subband is associated with a respective subcarrier that may be modulated with data.

In MIMO system 100, the MIMO channel formed by the $N_T$ transmit antennas at transmitting entity 110 and the $N_R$ receive antennas at receiving entity 150 may be characterized by an $N_R \times N_T$ channel response matrix H(m), which may be given as:

$$\underline{H}(m) = \begin{bmatrix} h_{1,1}(m) & h_{1,2}(m) & \cdots & h_{1,N_T}(m) \\ h_{2,1}(m) & h_{2,2}(m) & \cdots & h_{2,N_T}(m) \\ \vdots & \vdots & \ddots & \vdots \\ h_{N_R,1}(m) & h_{N_R,2}(m) & \cdots & h_{N_R,N_T}(m) \end{bmatrix}, \quad \text{Eq (1)}$$

where entry $h_{i,j}(m)$, for $i=1 \ldots N_R$ and $j=1 \ldots N_T$, denotes the coupling or complex channel gain between transmit antenna j and receive antenna i for transmission span m. A transmission span may cover time and/or frequency dimensions. For example, in a single-carrier MIMO system, a transmission span may correspond to one symbol period, which is the time interval to transmit one data symbol. In a multi-carrier MIMO system, a transmission span may correspond to one subband in one symbol period. A transmission span may also cover multiple symbol periods and/or multiple subbands. For simplicity, the MIMO channel is assumed to be full rank with $N_S = N_T \leq N_R$.

The MIMO system may support data transmission using one or more operating modes such as, for example, a "calibrated" mode and an "uncalibrated" mode. The calibrated mode may employ full-CSI transmission whereby data is transmitted on orthogonal spatial channels (or "eigenmodes") of the MIMO channel. The uncalibrated mode may employ partial-CSI transmission whereby data is transmitted on spatial channels of the MIMO channel, e.g., from individual transmit antennas.

The MIMO system may also employ steering transmit diversity (STD) to improve performance. With STD, the transmitting entity performs spatial processing with steering matrices so that a data transmission observes an ensemble of effective channels and is not stuck on a single bad channel realization for an extended period of time. Consequently, performance is not dictated by the worst-case channel condition.

1. Calibrated Mode—Full-CSI Transmission

For full-CSI transmission, eigenvalue decomposition may be performed on a correlation matrix of H(m) to obtain $N_S$ eigenmodes of H(m), as follows:

$$R(m) = H^H(m) \cdot H(m) = E(m) \cdot \Lambda(m) \cdot E^H(m), \quad \text{Eq (2)}$$

where R(m) is an $N_T \times N_T$ correlation matrix of H(m);

E(m) is an $N_T \times N_T$ unitary matrix whose columns are eigenvectors of R(m);

$\Lambda(m)$ is an $N_T \times N_T$ diagonal matrix of eigenvalues of R(m); and

"H" denotes a conjugate transpose.

A unitary matrix U is characterized by the property $U^H \cdot U = I$, where I is the identity matrix. The columns of a unitary matrix are orthogonal to one another, and each column has unit power. The matrix E(m) may be used for spatial processing by the transmitting entity to transmit data on the $N_S$ eigenmodes of H(m). The eigenmodes may be viewed as orthogonal spatial channels obtained through decomposition. The diagonal entries of $\Lambda(m)$ are eigenvalues of R(m), which represent the power gains for the $N_S$ eigenmodes. Singular value decomposition may also be performed to obtain matrices of left and right eigenvectors, which may be used for full-CSI transmission.

The transmitting entity performs spatial processing for full-CSI transmission with steering transmit diversity, as follows:

$$x_f(m) = E(m) \cdot V(m) \cdot s(m), \quad \text{Eq (3)}$$

where s(m) is an $N_T \times 1$ vector with up to $N_S$ data symbols to be sent in transmission span m;

V(m) is an $N_T \times N_T$ steering matrix for transmission span m;

E(m) is the matrix of eigenvectors for transmission span m; and $x_f(m)$ is an $N_T \times 1$ vector with $N_T$ transmit symbols to be sent from the $N_T$ transmit antennas in transmission span m.

As shown in equation (3), each data symbol in s(m) is effectively spatially spread with a respective column of V(m). If $N_S < N_T$, then $N_S$ data symbols in s(m) are spatially spread with an $N_S \times N_S$ matrix V(m) to obtain $N_S$ "spread" symbols. Each spread symbol includes a component of each of the $N_S$ data symbols. The $N_S$ spread symbols from the spatial spreading are then sent on the $N_S$ eigenmodes of H(m). Each steering matrix V(m) is a unitary matrix and may be generated as described below.

The receiving entity obtains received symbols from the $N_R$ receive antennas, which may be expressed as:

$$r_f(m) = H(m) \cdot x_f(m) + n(m) \qquad \text{Eq (4)}$$

$$= H(m) \cdot E(m) \cdot V(m) \cdot s(m) + n(m),$$

$$H_{f\_eff}(m) \cdot s(m) + n(m)$$

where $r_f(m)$ is an $N_R \times 1$ vector with $N_R$ received symbols obtained via the $N_R$ receive antennas in transmission span m;

n(m) is a noise vector for transmission span m; and $H_{f\_eff}(m)$ is an $N_R \times N_T$ "effective" MIMO channel response matrix observed by the data vector s(m) for full-CSI transmission with steering transmit diversity, which is:

$$H_{f\_eff}(m) = H(m) \cdot E(m) \cdot V(m) \qquad \text{Eq (5)}$$

For simplicity, the noise is assumed to be additive white Gaussian noise (AWGN) with a zero mean vector and a covariance matrix of $\Phi_{nn} = \sigma^2 \cdot I$, where $\sigma^2$ is the variance of the noise and I is the identity matrix.

The receiving entity can recover the data symbols in s(m) using various receiver processing techniques. The techniques applicable for full-CSI transmission include a full-CSI technique and a minimum mean square error (MMSE) technique.

For the full-CSI technique, the receiving entity may derive a spatial filter matrix $M_{fcsi}(m)$ as follows:

$$M_{fcsi}(m) = V^H(m) \cdot \Lambda^{-1}(m) \cdot E^H(m) \cdot H^H(m) \qquad \text{Eq (6)}$$

The receiving entity may perform receiver spatial processing using $M_{fcsi}(m)$, as follows:

$$\hat{s}_{fcsi}(m) = M_{fcsi}(m) \cdot r_f(m), \qquad \text{Eq (7)}$$

$$V^H(m) \cdot \Lambda^{-1}(m) \cdot E^H(m) \cdot H^H \cdot (m) \cdot$$

$$[H(m) \cdot E(m) \cdot V(m) \cdot s(m) + n(m)],$$

$$s(m) + n_f(m),$$

where $\hat{s}_{fcsi}(m)$ is an $N_T \times 1$ vector with $N_S$ detected data symbols; and $n_f(m)$ is the post-detection noise after the receiver spatial processing.

For the MMSE technique, the receiving entity may derive a spatial filter matrix $M_{f\_mmse}(m)$ as follows:

$$M_{f\_mmse}(m) = [H_{f\_eff}^H(m) \cdot H_{f\_eff}(m) + \sigma^2 \cdot I]^{-1} \cdot H_{f\_eff}^H(m) \qquad \text{Eq (8)}$$

The spatial filter matrix $M_{f\_mmse}(m)$ minimizes the mean square error between the symbol estimates from the spatial filter and the data symbols in s(m).

The receiving entity may perform MMSE spatial processing, as follows:

$$\hat{s}_{f\_mmse}(m) = D_{f\_mmse}^{-1}(m) \cdot M_{f\_mmse}(m) \cdot r_f(m), \qquad \text{Eq (9)}$$

$$= D_{f\_mmse}^{-1}(m) \cdot M_{f\_mmse}(m) \cdot$$

$$[H_{f\_eff}(m) \cdot s(m) + n(m)],$$

$$= D_{f\_mmse}^{-1}(m) \cdot M_{f\_mmse}(m) \cdot$$

$$H_{f\_eff}(m) \cdot s(m) + n_{f\_mmse}(m),$$

where $D_{f\_mmse}(m)$ is a diagonal matrix containing the diagonal elements of $M_{f\_mmse}(m) \cdot H_{f\_eff}(m)$, or $D_{f\_mmse}(m) = \text{diag}[M_{f\_mmse}(m) \cdot H_{f\_eff}(m)]$; and $n_{f\_mmse}(m)$ is the MMSE filtered noise.

The symbol estimates from the spatial filter $M_{f\_mmse}(m)$ are unnormalized estimates of the data symbols. The multiplication with the scaling matrix $D_{f\_mmse}(m)$ provides normalized estimates of the data symbols.

Full-CSI transmission attempts to send data on the eigenmodes of H(m). However, a full-CSI data transmission may not be completely orthogonal due to, for example, an imperfect estimate of H(m), error in the eigenvalue decomposition, finite arithmetic precision, and so on. The MMSE technique can account for (or "clean up") any loss of orthogonality in the full-CSI data transmission.

Table 1 summarizes the spatial processing at the transmitting and receiving entities for full-CSI transmission with steering transmit diversity.

TABLE 1

| Entity | Calibrated Mode - Full-CSI Transmission | |
|---|---|---|
| Transmitter | $x_f(m) = E(m) \cdot V(m) \cdot s(m)$ | Spatial Processing |
| | $H_{f\_eff}(m) = H(m) \cdot E(m) \cdot V(m)$ | Effective Channel |
| Receiver full-CSI | $M_{fcsi}(m) = V^H(m) \cdot \Lambda^{-1}(m) \cdot E^H(m) \cdot H^H(m)$ | Spatial Filter Matrix |
| | $\hat{s}_{fcsi}(m) = M_{fcsi}(m) \cdot r_f(m)$ | Spatial Processing |
| Receiver MMSE | $M_{f\_mmse}(m) = [H_{f\_eff}^H(m) \cdot H_{f\_eff}(m) + \sigma^2 \cdot I]^{-1} \cdot H_{f\_eff}^H(m)$ | Spatial Filter Matrix |
| | $D_{f\_mmse}(m) = \text{diag}[M_{f\_mmse}(m) \cdot H_{f\_eff}(m)]$ | |
| | $\hat{s}_{f\_mmse}(m) = D_{f\_mmse}^{-1}(m) \cdot M_{f\_mmse}(m) \cdot r_f(m)$ | Spatial Processing |

2. Uncalibrated Mode—Partial-CSI Transmission

For partial-CSI transmission with steering transmit diversity, the transmitting entity performs spatial processing as follows:

$$x_p(m) = V(m) \cdot s(m), \qquad \text{Eq (10)}$$

where $x_p(m)$ is the transmit data vector for transmission span m. As shown in equation (10), each data symbol in s(m) is spatially spread with a respective column of V(m). The $N_T$ spread symbols resulting from the multiplication with V(m) are then transmitted from the $N_T$ transmit antennas.

The receiving entity obtains received symbols, which may be expressed as:

$$r_p(m) = H(m) \cdot x_p(m) + n(m) \qquad \text{Eq (11)}$$

$$= H(m) \cdot V(m) \cdot s(m) + n(m),$$

$$= H_{p\_eff}(m) \cdot s(m) + n(m),$$

where $r_p(m)$ is the received symbol vector for transmission span m; and $H_{p\_eff}(m)$ is an $N_R \times N_T$ effective MIMO channel response matrix observed by s(m) for partial-CSI transmission with steering transmit diversity, which is:

$$H_{p\_eff}(m) = H(m) \cdot V(m). \qquad \text{Eq (12)}$$

The receiving entity can recover the data symbols in s(m) using various receiver processing techniques. The techniques applicable for partial-CSI transmission include a channel correlation matrix inversion (CCMI) technique (which is also commonly called a zero-forcing technique), the MMSE technique, and a successive interference cancellation (SIC) technique.

For the CCMI technique, the receiving entity may derive a spatial filter matrix $M_{ccmi}(m)$, as follows:

$$M_{ccmi}(m) = [H_{p\_eff}^H(m) \cdot H_{p\_eff}(m)]^{-1} \cdot H_{p\_eff}^H(m) = R_{p\_eff}^{-1}(m) \cdot H_{p\_eff}^H(m). \quad \text{Eq (13)}$$

The receiving entity may perform CCMI spatial processing, as follows:

$$\begin{aligned}\hat{s}_{ccmi}(m) &= M_{ccmi}(m) \cdot r_p(m), \quad \text{Eq (14)} \\ &= \underline{R}_{p\_eff}^{-1}(m) \cdot \underline{H}_{p\_eff}^H(m) \cdot [\underline{H}_{p\_eff}(m) \cdot \underline{s}(m) + \underline{n}(m)], \\ &= \underline{s}(m) + \underline{n}_{ccmi}(m),\end{aligned}$$

where $n_{ccmi}(m)$ is the CCMI filtered noise. Due to the structure of $R_{p\_eff}(m)$, the CCMI technique may amplify the noise.

For the MMSE technique, the receiving entity may derive a spatial filter matrix $M_{p\_mmse}(m)$, as follows:

$$M_{p\_mmse}(m) = [H_{p\_eff}^H(m) \cdot H_{p\_eff}(m) + \sigma^2 I]^{-1} H_{p\_eff}^H(m). \quad \text{Eq (15)}$$

Equation (15) for the partial-CSI transmission has the same form as equation (8) for the full-CSI transmission. However, $H_{p\_eff}(m)$ (instead of $H_{f\_eff}(m)$) is used in equation (15) for partial-CSI transmission.

The receiving entity may perform MMSE spatial processing, as follows:

$$\begin{aligned}\hat{s}_{p\_mmse}(m) &= \underline{D}_{p\_mmse}^{-1}(m) \cdot \underline{M}_{p\_mmse}(m) \cdot \underline{r}_p(m), \quad \text{Eq (9)} \\ &= \underline{D}_{p\_mmse}^{-1}(m) \cdot \underline{M}_{p\_mmse}(m) \cdot \\ &\quad \underline{H}_{p\_eff}(m) \cdot \underline{s}(m) + \underline{n}_{p\_mmse}(m),\end{aligned}$$

where $D_{p\_mmse}(m) = \text{diag}[M_{p\_mmse}(m) \cdot H_{p\_eff}(m)]$ and $n_{p\_mmse}(m)$ is the MMSE filtered noise for partial-CSI transmission.

For the SIC technique, the receiving entity recovers the data symbols in s(m) in successive stages. For clarity, the following description assumes that each element of s(m) and each element of $r_p(m)$ corresponds to one data symbol stream. The receiving entity processes the $N_R$ received symbol streams in $r_p(m)$ in $N_S$ successive stages to recover the $N_S$ data symbol streams in s(m). Typically, the SIC processing is such that one packet is recovered for one stream, and then another packet is recovered for another stream, and so on. For simplicity, the following description assumes $N_S = N_T$.

For each stage l, where l=1 ... $N_S$, the receiving entity performs receiver spatial processing on $N_R$ input symbol streams $r_p^l(m)$ for that stage. The input symbol streams for the first stage (l=1) are the received symbol streams, or $r_p^1(m) = r_p(m)$. The input symbol streams for each subsequent stage (l=2 ... $N_S$) are modified symbol streams from a preceding stage. The receiver spatial processing for stage l is based on a spatial filter matrix $M_x^l(m)$, which may be derived based on a reduced effective channel response matrix $H_{p\_eff}^l(m)$ and further in accordance with the CCMI, MMSE, or some other technique. $H_{p\_eff}^l(m)$ contains $N_S-l+1$ columns in $H_{p\_eff}(m)$ corresponding to $N_S-l+1$ data symbol streams not yet recovered in stage l. The receiving entity obtains one detected data symbol stream $\{\hat{s}_l\}$ for stage l and further processes (e.g., demodulates, deinterleaves, and decodes) this stream to obtain a corresponding decoded data stream $\{\hat{d}_l\}$.

The receiving entity next estimates the interference that data symbol stream $\{s_l\}$ causes to the other data symbol streams not yet recovered. To estimate the interference, the receiving entity processes (e.g., re-encodes, interleaves, and symbol maps) the decoded data stream $\{\hat{d}_l\}$ in the same manner performed by the transmitting entity for this stream and obtains a stream of "remodulated" symbols $\{\check{s}_l\}$, which is an estimate of the data symbol stream $\{s_l\}$ just recovered. The receiving entity then performs spatial processing on the remodulated symbol stream with steering matrices V(m) and further multiplies the result with channel response matrices H(m) to obtain $N_R$ interference components $i^l(m)$ caused by stream $\{s_l\}$. The receiving entity then subtracts the $N_R$ interference components $i^l(m)$ from the $N_R$ input symbol streams $r_p^l(m)$ for the current stage l to obtain $N_R$ input symbol streams $r_p^{l+1}(m)$ for the next stage, or $r_p^{l+1}(m) = r_p^l(m) - i^l(m)$. The input symbol streams $r_p^{l+1}(m)$ represent the streams that the receiving entity would have received if the data symbol stream $\{s_l\}$ had not been transmitted, assuming that the interference cancellation was effectively performed. The receiving entity then repeats the same processing on the $N_R$ input symbol streams $r_p^{l+1}(m)$ to recover another data stream. However, the effective channel response matrix $H_{p\_eff}^{l+1}(m)$ for the subsequent stage l+1 is reduced by one column corresponding to the data symbol stream $\{s_l\}$ recovered in stage l.

For the SIC technique, the SNR of each data symbol stream is dependent on (1) the receiver processing technique (e.g., CCMI or MMSE) used for each stage, (2) the specific stage in which the data symbol stream is recovered, and (3) the amount of interference due to the data symbol streams recovered in later stages. In general, the SNR progressively improves for data symbol streams recovered in later stages because the interference from data symbol streams recovered in prior stages is canceled. This may then allow higher rates to be used for data symbol streams recovered in later stages.

Table 2 summarizes the spatial processing at the transmitting and receiving entities for partial-CSI transmission with steering transmit diversity. For simplicity, the SIC technique is not shown in Table 2.

TABLE 2

| Entity | Uncalibrated Mode - Partial-CSI Transmission | |
|---|---|---|
| Transmitter | $\underline{x}_p(m) = \underline{V}(m) \cdot \underline{s}(m)$ | Spatial Processing |
| | $\underline{H}_{p\_eff}(m) = \underline{H}(m) \cdot \underline{V}(m)$ | Effective Channel |
| Receiver CCMI | $\underline{M}_{ccmi}(m) = [\underline{H}_{p\_eff}^H(m) \cdot \underline{H}_{p\_eff}(m)]^{-1} \cdot \underline{H}_{p\_eff}^H(m)$ | Spatial Filter Matrix |
| | $\underline{\hat{s}}_{ccmi}(m) = \underline{M}_{ccmi}(m) \cdot \underline{r}_p(m)$ | Spatial Processing |

TABLE 2-continued

| Entity | Uncalibrated Mode - Partial-CSI Transmission | |
|---|---|---|
| Receiver MMSE | $\underline{M}_{p\_mmse}(m) = [\underline{H}_{p\_eff}^H(m) \cdot \underline{H}_{p\_eff}(m) + \sigma^2 \cdot \underline{I}]^{-1} \cdot \underline{H}_{p\_eff}^H(m)$ | Spatial Filter Matrix |
| | $\underline{D}_{p\_mmse}(m) = \text{diag}\,[\underline{M}_{p\_mmse}(m) \cdot \underline{H}_{p\_eff}(m)]$ | |
| | $\underline{s}_{p\_mmse}(m) = \underline{D}_{p\_mmse}^{-1} \cdot \underline{M}_{p\_mmse}(m) \cdot \underline{r}_p(m)$ | Spatial Processing |

Figure 2:
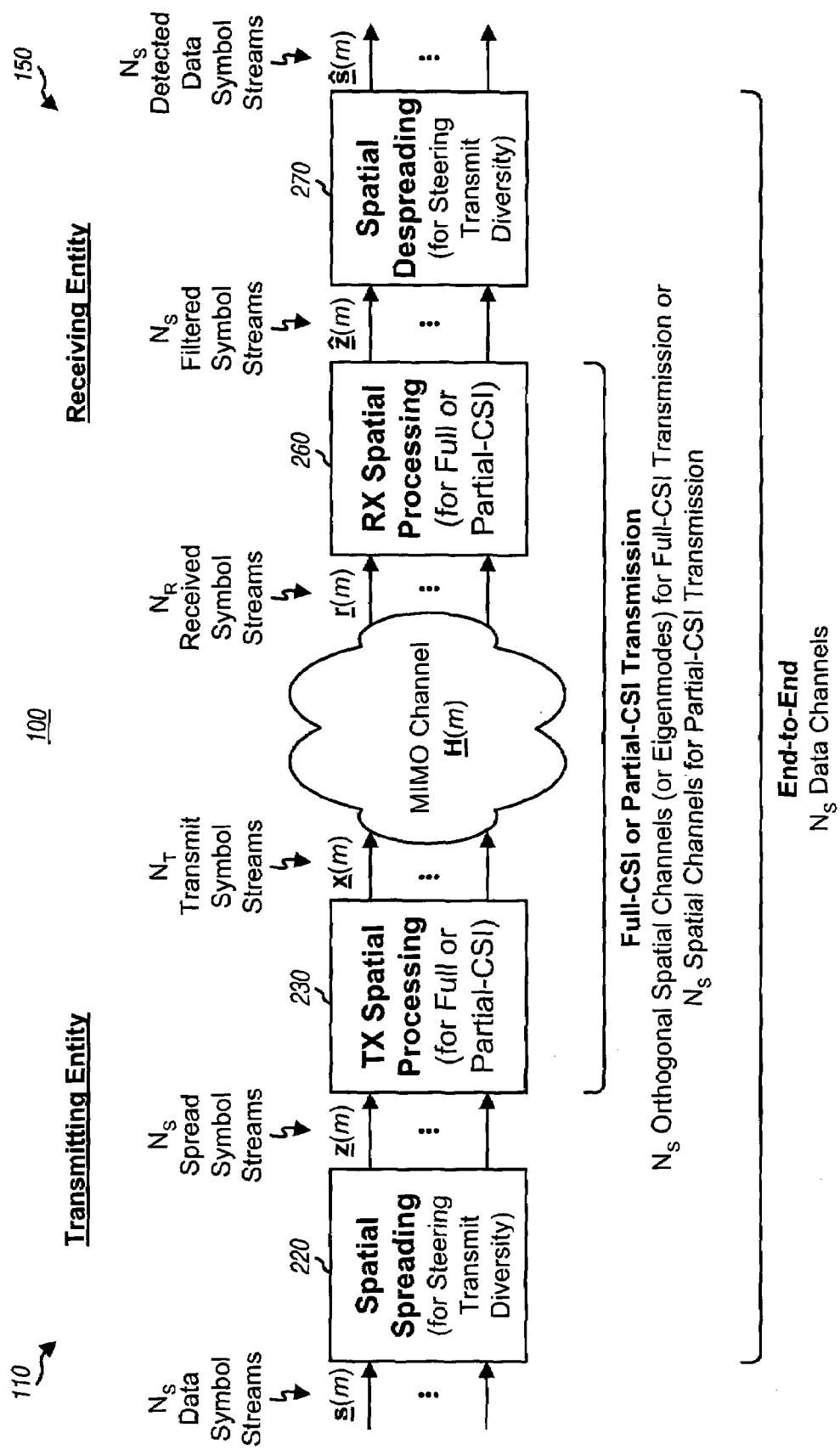
FIG. 2 shows a model for data transmission with steering transmit diversity.

FIG. 2 shows a model for data transmission with steering transmit diversity. Transmitting entity 110 performs spatial processing (or spatial spreading) for steering transmit diversity (block 220) and spatial processing for either full-CSI or partial-CSI transmission (block 230). Receiving entity 150 performs receiver spatial processing for full-CSI or partial-CSI transmission (block 260) and receiver spatial processing (or spatial despreading) for steering transmit diversity (block 270). As shown in FIG. 2, the transmitting entity performs spatial spreading for steering transmit diversity prior to the spatial processing (if any) for full-CSI and partial-CSI transmission. The receiving entity may perform the complementary receiver spatial processing for full-CSI or partial-CSI transmission followed by spatial despreading for steering transmit diversity.

3. Spatial Filter Matrix Computation

With steering transmit diversity, different steering matrices V(m) may be used for different transmission spans to randomize the effective MIMO channel observed by a data transmission. This may then improve performance since the data transmission does not observe a "bad" MIMO channel realization for an extended period of time. The transmission spans may correspond to symbol periods for a single-carrier MIMO system or subbands for a multi-carrier MIMO system.

Figure 3A:
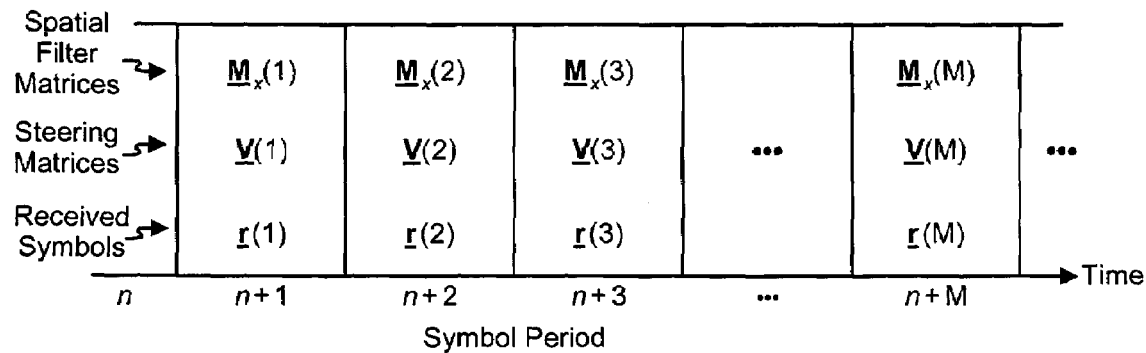
FIGS. 3A and 3B show data transmission in a single-carrier MIMO system and a multi-carrier MIMO system, respectively.

FIG. 3A shows a partial-CSI transmission with steering transmit diversity for a single-carrier MIMO system. For this system, the transmission span index m may be equal to a symbol period index n (or m=n). One vector s(n) of data symbols may be transmitted in each symbol period n and spatially spread with a steering matrix V(n) selected for that symbol period. Each data symbol vector s(n) observes an effective MIMO channel response of $H_{p\_eff}(n)=H(n) \cdot V(n)$ and is recovered using a spatial filter matrix $M_x(n)$.

Figure 3B:
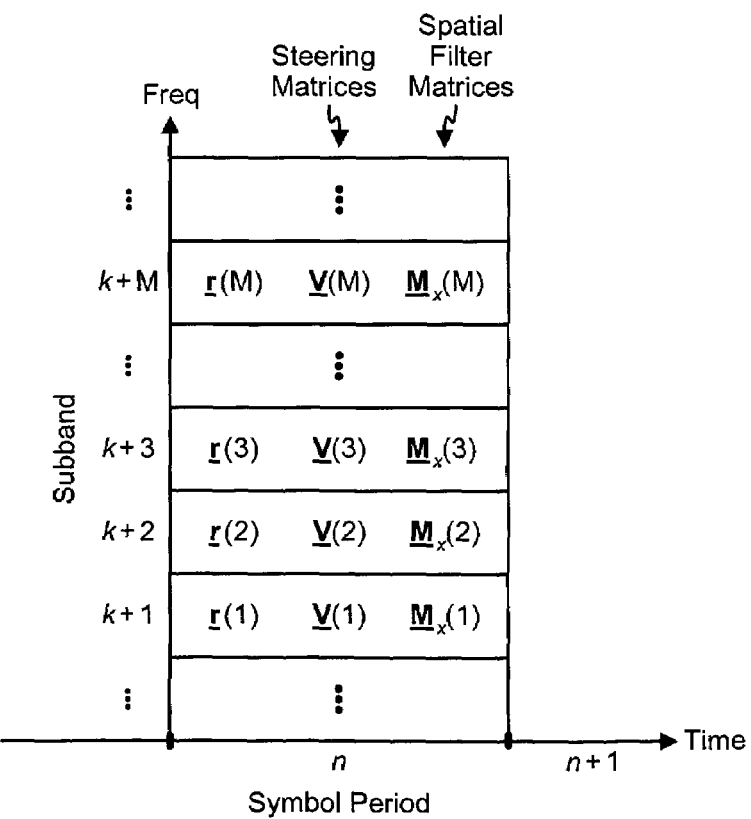

FIG. 3B shows a partial-CSI transmission with steering transmit diversity in a multi-carrier MIMO system. For this system, the transmission span index m may be equal to a subband index k (or m=k). For each symbol period, one vector s(k) of data symbols may be transmitted in each subband k and spatially spread with a steering matrix V(k) selected for that subband. Each data symbol vector s(k) observes an effective MIMO channel response of $H_{p\_eff}(k)=H(k) \cdot V(k)$ and is recovered using a spatial filter matrix $M_x(k)$. The vector s(k) and the matrices V(k), H(k), and $M_x(k)$ are also a function of symbol period n, but this is not shown for simplicity.

As shown in FIGS. 3A and 3B, if different steering matrices are used for different transmission spans, then the spatial filter matrices used by the receiving entity are a function of the transmission span index m. This is true even if the channel response matrix H(m) is fixed or constant over a range of transmission spans. For example, in a multi-carrier MIMO system, H(k) may be fixed across a set of subbands for a flat fading MIMO channel with a flat frequency response. As another example, in a single-carrier MIMO system, H(n) may be fixed over a given time interval for a MIMO channel with no temporal fading. This time interval may correspond to all or a portion of the time duration used to transmit a block of data symbols that is coded and decoded as a block.

A degree of correlation typically exists between the channel response matrices for adjacent transmission spans, e.g., between H(m) and H(m±1). This correlation may be exploited to simplify the computation for the spatial filter matrices at the receiving entity. The computation is described below for two cases—full-correlation and partial-correlation.

A. Full Correlation

With full-correlation, the channel response matrix for the MIMO channel is fixed over a range of transmission span indices of interest, e.g., for m=1 . . . M, where M may be any integer value greater than one. Thus, H(1)=H(2)=. . . =H(M)=H.

For the full-CSI technique, the spatial filter matrix $M_{fcsi}(m)$ with fully correlated channel response matrices may be expressed as:

$$M_{fcsi}(m)=V^H(m) \cdot \Lambda^{-1} \cdot E^H \cdot H^H. \qquad \text{Eq (17)}$$

The spatial filter matrix $M_{fcsi}(m)$ may then be computed as:

$$M_{fcsi}(m)=V^H(m) \cdot M_{fcsi\_base}, \text{ for } m=1 \ldots M \qquad \text{Eq (18)}$$

where $M_{fcsi\_base}=\Lambda^{-1} \cdot E^H \cdot H^H$ is a base spatial filter matrix, which is the spatial filter matrix for the full-CSI technique without steering transmit diversity. The base spatial filter matrix $M_{fcsi}$base is not a function of transmission span m because the channel response matrix H is fixed. Equation (18) indicates that the spatial filter matrix $M_{fcsi}(m)$ for each transmission span m may be obtained by pre-multiplying the base spatial filter matrix $M_{fcsi\_base}$ with the steering matrix $V^H(m)$ used for that transmission span.

Alternatively, the spatial filter matrix $M_{fcsi}(m)$ may be computed as:

$$M_{fcsi}(m)=W_1(m) \cdot M_{fcsi}(1), \text{ for } m=2 \ldots M \qquad \text{Eq (19)}$$

where $M_{fcsi}(1)=V^H(1) \cdot \Lambda^{-1} \cdot E^H \cdot H^H$ and $W_1(m)=V^H(m) \cdot V(1)$. Equation (19) indicates that the spatial filter matrix $M_{fcsi}(m)$ for each transmission span m may be obtained by pre-multiplying the spatial filter matrix $M_{ccmi}(1)$ for transmission span 1 with the matrix $W_1(m)$. The matrices $W_1(m)$, for m=2 . . . M, are unitary matrices, each of which is obtained by multiplying two unitary steering matrices V(m) and V(1). The matrices $W_1(m)$ may be pre-computed and stored in a memory.

For the MMSE technique for full-CSI transmission, the spatial filter matrix $M_{f\_mmse}(m)$ with fully correlated channel response matrices may be expressed as:

$$\begin{aligned}\underline{M}_{f\_mmse}(m) &= [\underline{H}_{f\_eff}^H(m) \cdot \underline{H}_{f\_eff}(m) + \sigma^2 \cdot \underline{I}]^{-1} \cdot \underline{H}_{f\_eff}^H(m), \quad \text{Eq (20)} \\ &= [\underline{V}^H(m) \cdot \underline{E}^H \cdot \underline{H}^H \cdot \underline{H} \cdot \underline{E} \cdot \underline{V}(m) + \sigma^2 \cdot \underline{I}]^{-1} \cdot \\ & \quad \underline{V}^H(m) \cdot \underline{E}^H \cdot \underline{H}^H, \\ &= \underline{V}^H(m) \cdot [\underline{E}^H \cdot \underline{H}^H \cdot \underline{H} \cdot \underline{E} \cdot \sigma^2 \cdot \underline{I}]^{-1} \cdot \underline{E}^H \cdot \underline{H}^H. \end{aligned}$$

Equation (20) is derived using the properties: $(A \cdot B)^{-1}= B^{-1} \cdot A^{-1}$ and $V \cdot V^H=I$. The term within bracket in the second equality in equation (20) may be expressed as:

$$[\underline{V}^H \cdot \underline{E}^H \cdot \underline{H}^H \cdot \underline{H} \cdot \underline{E} \cdot \underline{V} + \sigma^2 \cdot \underline{I}] = [\underline{V}^H (\underline{E}^H \cdot \underline{H}^H \cdot \underline{H} \cdot \underline{E} \cdot \sigma^2 \cdot$$
$$\underline{V} \cdot \underline{I} \cdot \underline{V}^H) \cdot \underline{V}],$$
$$= [\underline{V}^H (\underline{E}^H \cdot \underline{H}^H \cdot \underline{H} \cdot \underline{E} + \sigma^2 \cdot \underline{I}) \cdot \underline{V}], \quad 5$$

where "(m)" has been omitted for clarity. The inverse of the term in the second equality above may then be expressed as:

$$[V^H(E^H \cdot H^H \cdot H \cdot E + \sigma^2 \cdot I) \cdot V]^{-1} =$$
$$[V^H(E^H \cdot H^H \cdot E + \sigma^2 \cdot I)^{-1} \cdot V],$$

where $V^H = V^{-1}$.

The spatial filter matrix $M_{f\_mmse}(m)$ may be computed as:

$$M_{f\_mmse}(m) = V^H(m) \cdot M_{f\_mmse\_base}, \text{ for } m=1 \ldots M, \quad \text{Eq (21)}$$

where $M_{f\_mmse\_base} = [\underline{E}^h \cdot \underline{H}^H \cdot \underline{E} + \sigma^2 \cdot \underline{I}]^{-1} \cdot \underline{E}^H \cdot \underline{H}^H$. Similar to the full-CSI technique, the spatial filter matrix $M_{f\_mmse}(m)$ for transmission span m may be obtained by pre-multiplying the base spatial filter matrix $M_{f\_mmse\_base}$ with the steering matrix $V^H(m)$. The spatial filter matrix $M_{f\_mmse}(m)$ may also be computed as:

$$M_{f\_mmse}(m) = W_1(m) \cdot M_{f\_mmse}(1), \text{ for } m=2 \ldots M, \quad \text{Eq (22)}$$

where $M_{f\_mmse}(1) = V^H(1) \cdot [\underline{E}^H \cdot \underline{H}^H \cdot \underline{H} \cdot \underline{E} + \sigma^2 \cdot \underline{I}]^{-1} \cdot \underline{E}^H \cdot \underline{H}^H$.

For the CCMI technique, the spatial filter matrix $M_{ccmi}(m)$ with fully correlated channel response matrices may be expressed as:

$$M_{ccmi}(m) = [H^H_{p\_eff}(m) \cdot H_{p\_eff}(m)]^{-1} \cdot H^H_{p\_eff}(m), \quad \text{Eq (23)}$$
$$= [\underline{V}^H(m) \cdot \underline{H}^H \cdot \underline{H} \cdot \underline{V}(m)]^{-1} \cdot \underline{V}^H(m) \cdot \underline{H}^H,$$
$$= [\underline{V}^H(m) \cdot \underline{R} \cdot \underline{V}(m)]^{-1} \cdot \underline{V}^H(m) \cdot \underline{H}^H,$$
$$= \underline{V}^{-1}(m) \cdot \underline{R}^{-1} \cdot [\underline{V}^H(m)]^{-1} \cdot \underline{V}^H(m) \cdot \underline{H}^H,$$
$$= \underline{V}^H(m) \cdot \underline{R}^{-1} \cdot \underline{H}^H,$$

where $[V^H(m)]^{-1} = V(m)$ because $V(m)$ is a unitary matrix.

The spatial filter matrix $M_{ccmi}(m)$ may thus be computed as:

$$M_{ccmi}(m) = V^H(m) \cdot M_{ccmi\_base}, \text{ for } m=1 \ldots M, \quad \text{Eq (24)}$$

where $M_{ccmi\_base} = R^{-1} \cdot H^H$. The spatial filter matrix $M_{ccmi}(m)$ may also be computed as:

$$M_{ccmi}(m) = W_1(m) \cdot M_{ccmi}(1), \text{ for } m=2 \ldots M, \quad \text{Eq (25)}$$

where $M_{ccmi}(1) = V^H(1) \cdot R^{-1} \cdot H^H$.

For the MMSE technique for partial-CSI transmission, the spatial filter matrix $M_{p\_mmse}(m)$ with fully correlated channel response matrices may be expressed as:

$$M_{p\_mmse}(m) = [H^H_{p\_eff}(m) \cdot H_{p\_eff}(m) + \sigma^2 \cdot I]^{-1} \cdot H^H_{p\_eff}(m), \quad \text{Eq (26)}$$
$$= [\underline{V}^H(m) \cdot \underline{H}^H \cdot \underline{H} \cdot \underline{V}(m) +$$
$$\sigma^2 \cdot \underline{I}]^{-1} \cdot \underline{V}^H(m) \cdot \underline{H}^H,$$
$$= \underline{V}^H(m) \cdot [\underline{H}^H \cdot \underline{H} + \sigma^2 \cdot \underline{I}]^{-1} \cdot \underline{H}^H.$$

Equation (26) may be derived in similar manner as equation (20) above.

The spatial filter matrix $M_{p\_mmse}(m)$ maybe computed as:

$$M_{p\_mmse}(m) = V^H(m) \cdot M_{p\_mmse\_base}, \text{ for } m=1 \ldots M, \quad \text{Eq (27)}$$

where $M_{p\_mmse\_base} = [H^H \cdot H + \sigma^2 \cdot I]^{-1} \cdot H^H$. The spatial filter matrix $M_{p\_mmse}(m)$ may also be computed as:

$$M_{p\_mmse}(m) = W_1(m) \cdot M_{p\_mmse}(1), \text{ for } m=2 \ldots M, \quad \text{Eq (28)}$$

where $M_{p\_mmse}(1) = V^H(1) \cdot [H^H \cdot H + \sigma^2 \cdot I]^{-1} \cdot H^H$.

Table 3 summarizes the computation for the spatial filter matrices for full-CSI and partial-CSI transmissions with fully correlated channel response matrices over transmission spans m=1 ... M.

TABLE 3

Spatial Filter Matrices with Full Correlation

| Mode | Spatial Filter Matrix | Technique |
|---|---|---|
| Full-CSI | $\underline{M}_{fcsi\_base} = \underline{\Lambda}^{-1} \cdot \underline{E}^H \cdot \underline{H}^H$, and $\underline{M}_{fcsi}(m) = \underline{V}^H(m) \cdot \underline{M}_{fcsi\_base}$ | Full-CSI |
|  | $\underline{M}_{f\_mmse\_base} = [\underline{E}^H \cdot \underline{H}^H \cdot \underline{H} \cdot \underline{E} + \sigma^2 \cdot \underline{I}]^{-1} \cdot \underline{E}^H \cdot \underline{H}^H$, and $\underline{M}_{f\_mmse\_base}(m) = \underline{V}^H(m) \cdot \underline{M}_{f\_mmse\_base}$ | MMSE |
| Partial-CSI | $\underline{M}_{ccmi\_base} = \underline{R}^{-1} \cdot \underline{H}^H$, and $\underline{M}_{ccmi}(m) = \underline{V}^H(m) \cdot \underline{M}_{ccmi\_base}$ | CCMI |
|  | $\underline{M}_{p\_mmse\_base} = [\underline{H}^H \cdot \underline{H} + \sigma^2 \cdot \underline{I}]^{-1} \cdot \underline{H}^H$, and $\underline{M}_{p\_mmse}(m) = \underline{V}^H(m) \cdot \underline{M}_{p\_mmse\_base}$ | MMSE |

In general, the spatial filter matrix for transmission span m may be computed as $M_x(m) = V^H(m) \cdot M_{x\_base}$, where the subscript "x" denotes the receiver processing technique and may be "fcsi", "f_mmse", "ccmi", or "p_mmse". The base spatial filter matrix $M_{x\_base}$ may be computed as if steering transmit diversity was not used.

Figure 4:
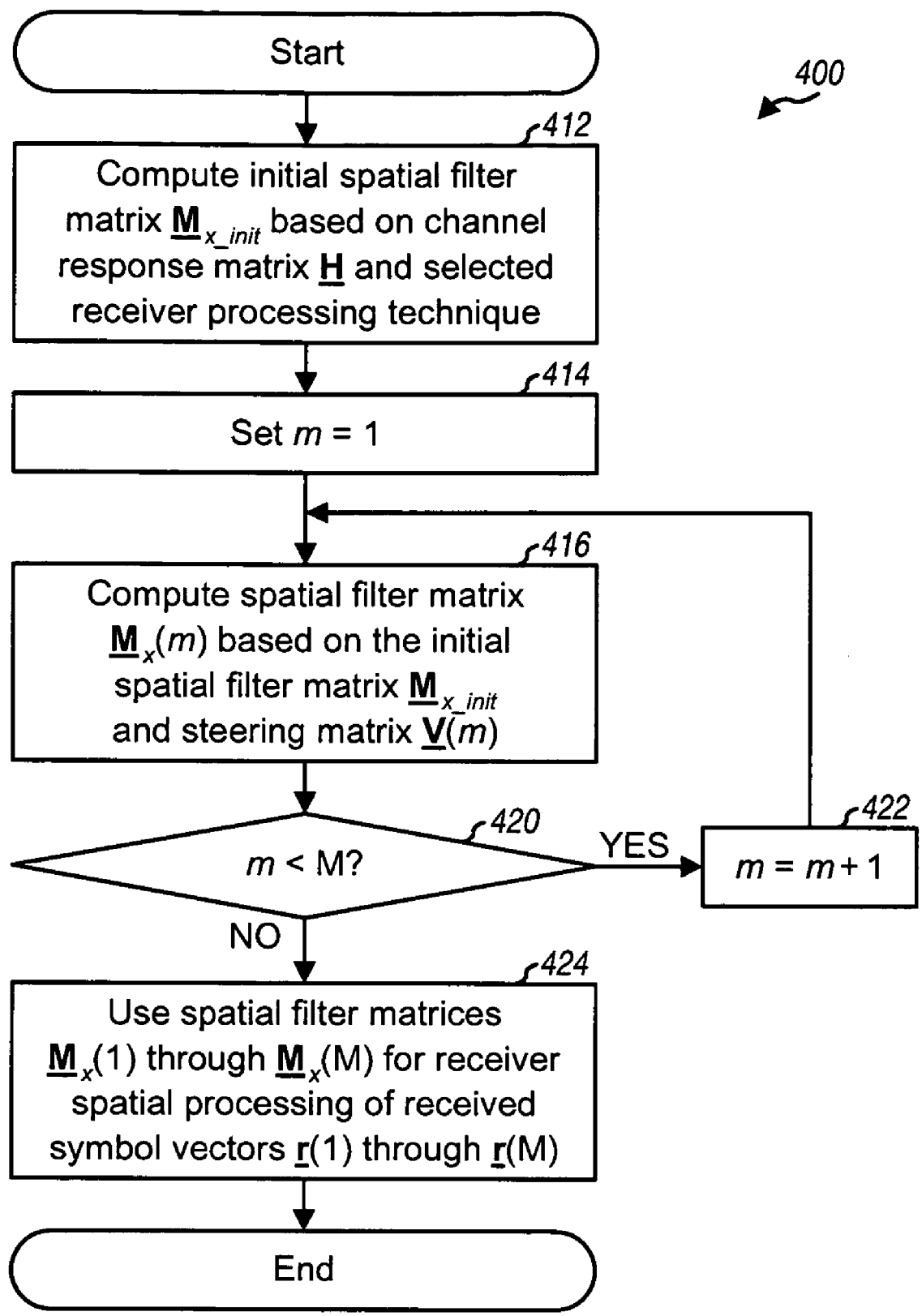
FIGS. 4 and 5 show processes to compute spatial filter matrices for fully and partially correlated channel response matrices, respectively.

FIG. 4 shows a flow diagram of a process 400 to compute spatial filter matrices with fully correlated channel response matrices over transmission spans m=1 ... M. An initial spatial filter matrix $M_{x\_init}$ is first computed (block 412). This initial spatial filter matrix may be the base spatial filter matrix $M_{x\_base}$ that is derived based on (1) the channel response matrix H and (2) the receiver processing technique selected for use (e.g., full-CSI, MMSE for full-CSI, CCMI, or MMSE for partial-CSI). Alternatively, the initial spatial filter matrix may be the spatial filter matrix $M_x(1)$ for transmission span m=1, which may be derived based on H and V(1).

The transmission span index m is then set to 1 if $M_{x\_init} = M_{x\_base}$ (as shown in FIG. 4) or set to 2 if $M_{x\_init} = M_x(1)$ (block 414). The spatial filter matrix $M_x(m)$ for transmission span m is then computed based on the initial spatial filter matrix $M_{x\_init}$ and the steering matrix V(m) used for transmission span m (block 416). In particular, $M_x(m)$ may be computed based on either $M_{x\_base}$ and V(m) or $M_x(1)$ and $W_1(m)$, as described above. A determination is then made whether m<M (block 420). If the answer is 'yes, then the index m is incremented (block 422), and the process returns to block 416 to compute the spatial filter matrix for another transmission span. Otherwise, if m=M in block 420, then the spatial filter matrices $M_x(1)$ through $M_x(M)$ are used for receiver spatial processing of received symbol vectors $r_x(1)$ through $r_x(M)$, respectively (block 424). Although not shown in FIG. 4 for simplicity, each spatial filter matrix may be used for receiver spatial processing as soon as both the spatial filter matrix $M_x(m)$ is generated and the received symbol vector $r_x(m)$ are obtained.

For full-CSI transmission, the spatial processing at the transmitting entity may also be simplified as: $x_f(m) = E \cdot V(m) \cdot s(m)$. A matrix $E \cdot V(m)$ may be computed for each transmission span m based on the steering matrix $V(m)$ for that transmission span and the matrix E, which is not a function of transmission span for the full correlation case.

B. Partial Correlation

With partial-correlation, the channel response matrices for the MIMO channel are less than fully correlated across a range of transmission span indices of interest. In this case, a spatial filter matrix computed for a transmission span l may be used to facilitate the computation of a spatial filter matrix for another transmission span m.

In an embodiment, a base spatial filter matrix $M_{x\_base}(l)$ for transmission span l is obtained from a spatial filter matrix $M_x(l)$ computed for transmission span l by removing the steering matrix $V(l)$ used for transmission span l, as follows:

$$M_{x\_base}(l) = V(l) \cdot M_x(l). \quad \text{Eq (29)}$$

The base spatial filter matrix $M_{x\_base}(l)$ is then used to derive a base spatial filter matrix $M_{x\_base}(m)$ for transmission span m (e.g., m=l+1). $M_{x\_base}(m)$ may be computed, e.g., using an iterative procedure or algorithm that iteratively performs a set of computations on $M_{x\_base}(l)$ to obtain a final solution for $M_{x\_base}(m)$. Iterative procedures for computing an MMSE solution (e.g., adaptive MMSE algorithms, gradient algorithm, lattice algorithms, and so on) are known in the art and not described herein. The spatial filter matrix $M_x(m)$ for transmission span m may be computed as:

$$M_x(m) = V^H(m) \cdot M_{x\_base}(m). \quad \text{Eq (30)}$$

The processing order for this embodiment may thus be given as: $M_x(l) \rightarrow M_{x\_base}(l) \Rightarrow M_{x\_base}(m) \rightarrow M_x(m)$, where "$\rightarrow$" denotes a direct computation and "$\Rightarrow$" denotes possible iterative computation. The base spatial filter matrices $M_{x\_base}(l)$ and $M_{x\_base}(m)$ do not contain steering matrices, whereas the spatial filter matrices $M_x(l)$ and $M_x(m)$ contain steering matrices $V(l)$ and $V(m)$ used for transmission spans l and m, respectively.

In another embodiment, the spatial filter matrix $M_x(m)$ for transmission span m is computed using an iterative procedure that iteratively performs a set of computations on an initial guess $\tilde{M}_x(m)$. The initial guess may be derived from the spatial filter matrix $M_x(l)$ derived for transmission span l, as follows:

$$\tilde{M}_x(m) = W_i(m) \cdot M_x(l), \quad \text{Eq (31)}$$

where $W_i(m) = V^H(m) \cdot V(l)$. The processing order for this embodiment may be given as: $M_x(l) \rightarrow \tilde{M}_x(m) \Rightarrow M_x(m)$. The spatial filter matrices $\tilde{M}_x(m)$ and $M_x(m)$ both contain the steering matrix $V(m)$ used for transmission span m.

For the above embodiments, $M_{x\_base}(l)$ and $\tilde{M}_x(m)$ may be viewed as the initial spatial filter matrices used to derive the spatial filter matrix $M_x(m)$ for a new transmission span m. In general, the amount of correlation between $M_x(l)$ and $M_x(m)$ is dependent on the amount of correlation between $M_{x\_base}(l)$ and $M_{x\_base}(m)$, which is dependent on the amount of correlation between $H(l)$ and $H(m)$ for transmission spans l and m. A higher degree of correlation may result in faster convergence to the final solution for $M_x(l)$.

Figure 5:
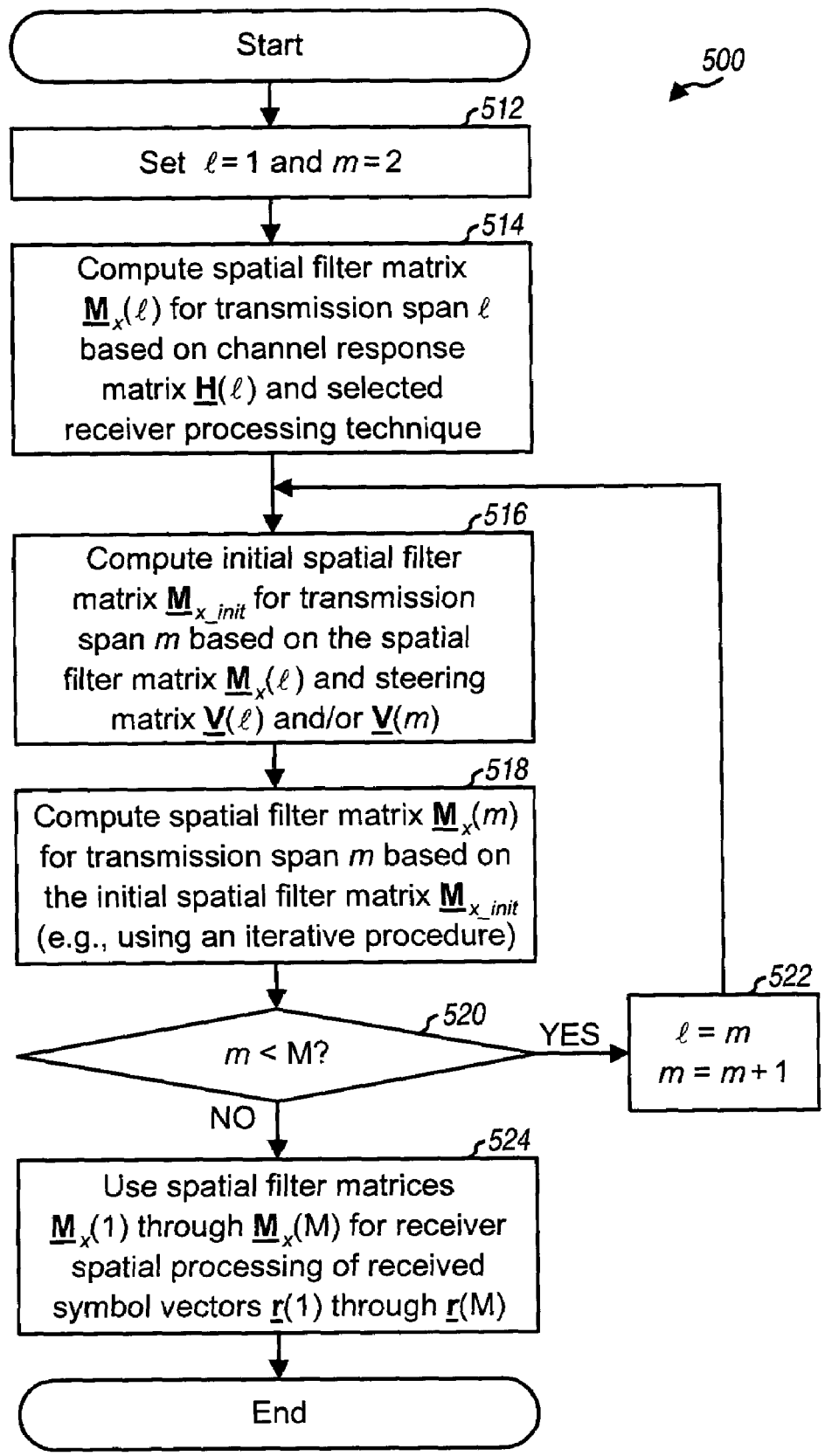

FIG. 5 shows a flow diagram of a process 500 to compute spatial filter matrices with partially correlated channel response matrices for transmission spans m=1 . . . M. The indices for the current and next transmission spans are initialized as l=1 and m=2 (block 512). A spatial filter matrix $M_x(l)$ is computed for transmission span l in accordance with the receiver processing technique selected for use (block 514). An initial spatial filter matrix $M_{x\_init}$ for transmission span m is then computed based on the spatial filter matrix $M_x(l)$ and the proper steering matrix/matrices $V(l)$ and $V(m)$, e.g., as shown in equation (29) or (31) (block 516). The spatial filter matrix $M_x(m)$ for transmission span m is then computed based on the initial spatial filter matrix $M_{x\_init}$, e.g., using an iterative procedure (block 518).

A determination is then made whether m<M (block 520). If the answer is 'yes', then the indices l and m are updated, e.g., as l=m and m=m+1 (block 522). The process then returns to block 516 to compute a spatial filter matrix for another transmission span. Otherwise, if all spatial filter matrices have been computed, as determined in block 520, then the spatial filter matrices $M_x(l)$ through $M_x(M)$ are used for receiver spatial processing of received symbol vectors $r_x(l)$ through $r_x(M)$, respectively (block 524).

For simplicity, FIG. 5 shows the computation of M spatial filter matrices for M consecutive transmission spans m=1 . . . M. The transmission spans do not need to be contiguous. In general, a spatial filter matrix derived for one transmission span l is used to obtain an initial guess of a spatial filter matrix for another transmission span m, where l and m may be any index values.

4. Steering Matrices

A set of steering matrices (or transmit matrices) may be generated and used for steering transmit diversity. These steering matrices may be denoted as $\{V\}$, or $V(i)$ for i=1 . . . L, where L may be any integer greater than one. Each steering matrix $V(i)$ should be a unitary matrix. This condition ensures that the $N_T$ data symbols transmitted simultaneously using $V(i)$ have the same power and are orthogonal to one another after the spatial spreading with $V(i)$.

The set of L steering matrices may be generated in various manners. For example, the L steering matrices may be generated based on a unitary base matrix and a set of scalars. The base matrix may be used as one of the L steering matrices. The other L−1 steering matrices may be generated by multiplying the rows of the base matrix with different combinations of scalars. Each scalar may be any real or complex value. The scalars are selected to have unit magnitude so that steering matrices generated with these scalars are unitary matrices.

The base matrix may be a Walsh matrix. A 2×2 Walsh matrix $\underline{W}_{2 \times 2}$ and a larger size Walsh matrix $\underline{W}_{2N \times 2N}$ may be expressed as:

$$\underline{W}_{2 \times 2} = \begin{bmatrix} 1 & 1 \\ 1 & -1 \end{bmatrix} \quad \text{Eq (32)}$$

and $$\underline{W}_{2N \times 2N} = \begin{bmatrix} \underline{W}_{N \times N} & \underline{W}_{N \times N} \\ \underline{W}_{N \times N} & -\underline{W}_{N \times N} \end{bmatrix}.$$

Walsh matrices have dimensions that are powers of two (e.g., 2, 4, 8, and so on).

The base matrix may also be a Fourier matrix. For an N×N Fourier matrix $D_{N \times N}$, the element $d_{n,m}$ in the n-th row and m-th column of $D_{N \times N}$ may be expressed as:

$$d_{n,m} = e^{-j2\pi\frac{(n-1)(m-1)}{N}}, \quad \text{Eq (33)}$$

for $n = \{1 \ldots N\}$ and $m = \{1 \ldots N\}$.

Fourier matrices of any square dimension (e.g., 2, 3, 4, 5, and so on) may be formed. Other matrices may also be used as the base matrix.

For an N×N base matrix, each of rows 2 through N of the base matrix may be independently multiplied with one of K different possible scalars. $K^{N-1}$ different steering matrices may be obtained from $K^{N-1}$ different permutations of the K scalars for N−1 rows. For example, each of rows 2 through N may be independently multiplied with a scalar of +1, −1, +j, or −j. For N=4 and K=4, 64 different steering matrices may be generated from a 4×4 base matrix with four different scalars. In general, each row of the base matrix may be multiplied with any scalar having the form $e^{j\theta}$, where θ may be any phase value. Each element of a scalar-multiplied N×N base matrix is further scaled by $1/\sqrt{N}$ to obtain an N×N steering matrix having unit power for each column.

Steering matrices derived based on a Walsh matrix (or a 4×4 Fourier matrix) have certain desirable properties. If the rows of the Walsh matrix are multiplied with scalars of ±1 and ±j, then each element of a resultant steering matrix is +1, −1, +j, or −j. In this case, the multiplication of an element (or "weight") of a spatial filter matrix with an element of the steering matrix may be performed with just bit manipulation. If the elements of the L steering matrices belong in a set composed of {+1, −1, +j, −j}, then the computation to derive the spatial filter matrices for the full correlation case can be greatly simplified.

5. MIMO System

Figure 6:
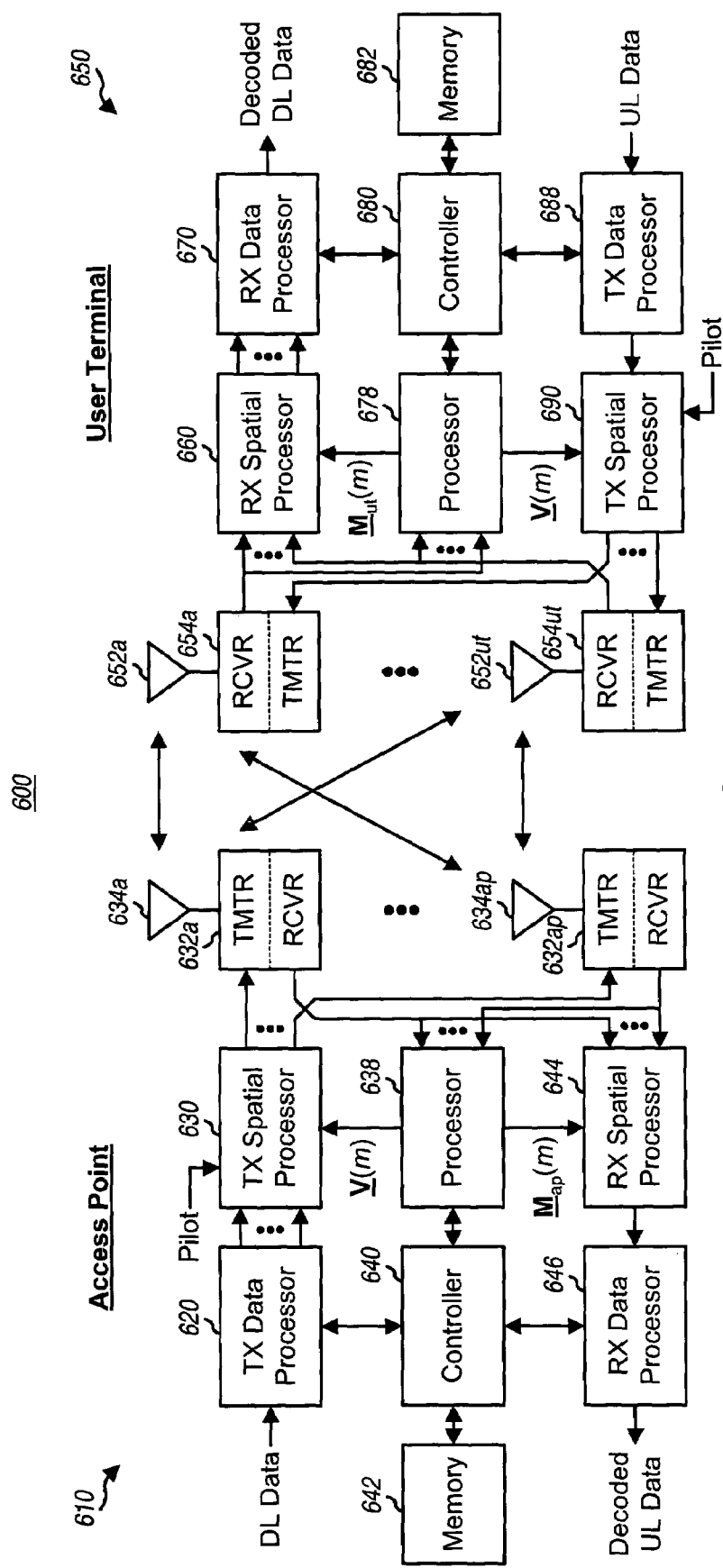
FIG. 6 shows a block diagram of an access point and a user terminal.

FIG. 6 shows a block diagram of an access point 610 and a user terminal 650 in a MIMO system 600. Access point 610 is equipped with $N_{ap}$ antennas that may be used for data transmission and reception, and user terminal 650 is equipped with $N_{ut}$ antennas, where $N_{ap}>1$ and $N_{ut}>1$.

On the downlink, at access point 610, a TX data processor 620 receives and processes (encodes, interleaves, and symbol maps) traffic/packet data and control/overhead data and provides data symbols. A TX spatial processor 630 performs spatial processing on the data symbols with steering matrices V(m) and possibly eigenvector matrices E(m) for the downlink, e.g., as shown in Tables 1 and 2. TX spatial processor 630 also multiplexes in pilot symbols, as appropriate, and provides $N_{ap}$ streams of transmit symbols to $N_{ap}$ transmitter units 632a through 632ap. Each transmitter unit 632 receives and processes a respective transmit symbol stream and provides a corresponding downlink modulated signal. $N_{ap}$ downlink modulated signals from transmitter units 632a through 632ap are transmitted from $N_{ap}$ antennas 634a through 634ap, respectively.

At user terminal 650, $N_{ut}$ antennas 652a through 652ut receive the transmitted downlink modulated signals, and each antenna provides a received signal to a respective receiver unit 654. Each receiver unit 654 performs processing complementary to that performed by receiver unit 632 and provides received symbols. An RX spatial processor 660 performs receiver spatial processing on the received symbols from all $N_{ut}$ receiver units 654a through 654ut, e.g., as shown in Tables 1 and 2, and provides detected data symbols. An RX data processor 670 processes (e.g., symbol demaps, deinterleaves, and decodes) the detected data symbols and provides decoded data for the downlink.

The processing for the uplink may be the same or different from the processing for the downlink. Traffic and control data is processed (e.g., encoded, interleaved, and symbol mapped) by a TX data processor 688, spatially processed by a TX spatial processor 690 with steering matrices V(m) and possibly eigenvector matrices E(m) for the uplink, and multiplexed with pilot symbols to generate $N_{ut}$ transmit symbol streams. $N_{ut}$ transmitter units 654a through 654ut condition the $N_{ut}$ transmit symbol streams to generate $N_{ut}$ uplink modulated signals, which are transmitted via $N_{ut}$ antennas 652a through 652ut.

At access point 610, the uplink modulated signals are received by $N_{ap}$ antennas 634a through 634ap and processed by $N_{ap}$ receiver units 632a through 632ap to obtain received symbols for the uplink. An RX spatial processor 644 performs receiver spatial processing on the received symbols and provides detected data symbols, which are further processed by an RX data processor 646 to obtain decoded data for the uplink.

Processors 638 and 678 perform channel estimation and spatial filter matrix computation for the access point and user terminal, respectively. Controllers 640 and 680 control the operation of various processing units at the access point and user terminal, respectively. Memory units 642 and 682 store data and program codes used by controllers 630 and 680, respectively.

Figure 7:
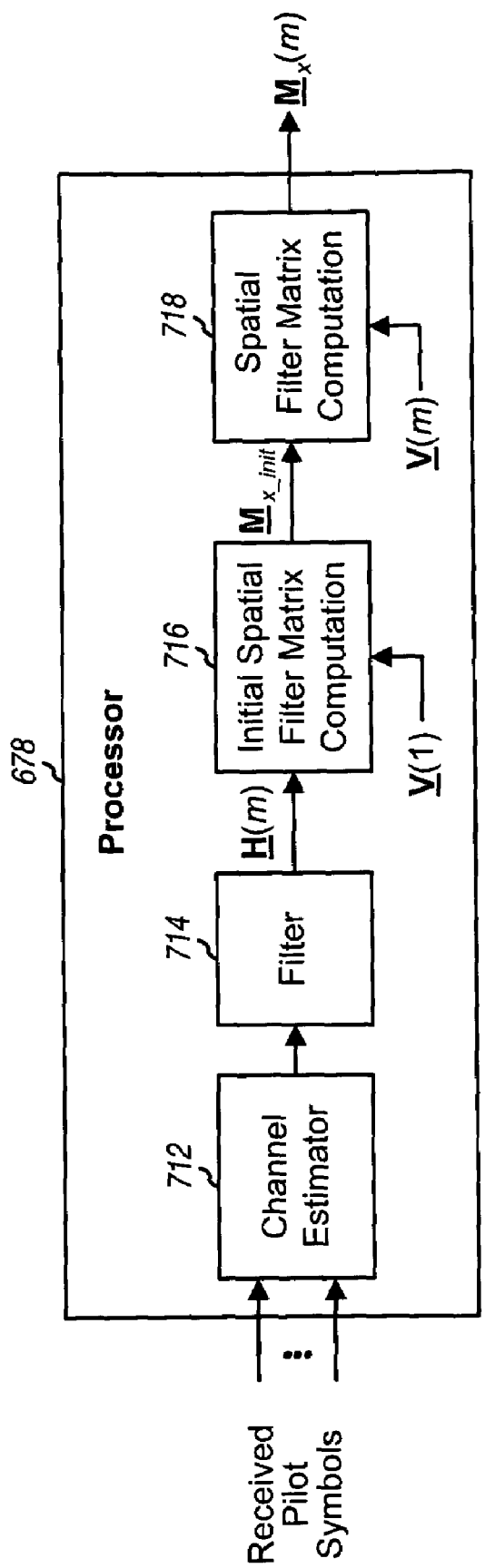
FIG. 7 shows a block diagram of a processor for spatial filter matrix computation.

FIG. 7 shows an embodiment of processor 678, which performs channel estimation and spatial filter matrix computation for user terminal 650. A channel estimator 712 obtains received pilot symbols and derives a channel response matrix for each transmission span in which received pilot symbols are available. A filter 714 may perform time-domain filtering of the channel response matrices for the current and prior transmission spans to obtain a higher quality channel response matrix H(m). A unit 716 then computes an initial spatial filter matrix $M_{x\_init}$.

For fully correlated H(m), the initial spatial filter matrix $M_{x\_init}$ may be (1) a base spatial filter matrix $M_{x\_base}$ computed based on H(m) and the selected receiver processing technique or (2) a spatial filter matrix $M_x(1)$ for transmission span 1 computed based on H(1), V(1), and the selected receiver processing technique. For partially correlated H(m), the initial spatial filter matrix $M_{x\_init}$ may be an initial guess $M_{x\_base}(l)$ or $\tilde{M}_x(m)$ that is obtained based on a spatial filter matrix $M_x(l)$ computed for another transmission span l. A unit 718 computes the spatial filter matrix $M_x(m)$ for transmission span m based on the initial spatial filter matrix $M_{x\_init}$ and the steering matrix V(m) used for that transmission span. For partially correlated H(m), unit 718 may implement an iterative procedure to compute for $M_x(m)$ based on the initial spatial filter matrix, which is an initial guess of $M_x(m)$.

Processor 638 performs channel estimation and spatial filter matrix computation for access point 610 and may be implemented in similar manner as processor 678.

The spatial filter matrix computation techniques described herein may be implemented by various means. For example, these techniques may be implemented in hardware, software, or a combination thereof. For a hardware implementation, the processing units for spatial filter matrix computation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the spatial filter matrix computation may be performed with modules (e.g., procedures, functions, and so on). The software codes may be stored in memory units (e.g., memory units 642 and 682 in FIG. 6) and executed by processors (e.g., controllers 640 and 680 in FIG. 6). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting data including a stream of symbols via a multiple-input multiple-output (MIMO) channel, comprising:
   deriving an initial spatial filter matrix based on both a channel response matrix and a selected receiver processing technique; and
   performing spatial processing on the stream of symbols with a spatial filter based on the initial spatial filter matrix and with different steering matrices so that a data transmission observes a plurality of effective channels.

2. The method of claim 1, wherein the data transmission comprises a frame.

3. The method of claim 1, wherein the data transmission comprises a plurality of OFDM symbols.

4. The method of claim 1, comprising:
   determining a spatial filter matrix for each of a plurality of transmission spans within a static range based on the initial spatial filter matrix, and a steering matrix used for respective transmission spans; and
   performing spatial processing using the spatial filter matrix determined for each of the plurality of transmission spans during each of the plurality of transmission spans.

5. The method of claim 1, comprising deriving a second spatial filter matrix based on the initial spatial filter matrix.

6. The method of claim 5, comprising deriving a third spatial filter matrix based on the second spatial filter matrix.

7. A computer-readable medium having stored thereon computer executable instructions for transmitting data including a stream of symbols via a multiple-input multiple-output (MIMO) channel, the instructions comprising code for;
   deriving an initial spatial filter matrix based on a channel response matrix and a selected receiver processing technique; and
   performing spatial processing using a spatial filter matrix based on the initial spatial filter matrix and with different steering matrices so that a data transmission observes a plurality of effective channels.

8. The computer-readable medium of claim 7, wherein the data transmission comprises a frame.

9. The computer-readable medium of claim 7, wherein the data transmission comprises a plurality of OFDM symbols.

10. The computer-readable medium of claim 7, further comprising instructions for:
    determining a spatial filter matrix for each of a plurality of transmission spans within a static range based on the initial spatial filter matrix, and a steering matrix used for respective transmission spans and
    performing spatial processing using the spatial filter matrix determined for each of the plurality of transmission spans during each of the plurality of transmission spans.

11. The computer-readable medium of claim 7, further comprising instructions for deriving a second spatial filter matrix based on the initial spatial filter matrix.

12. The computer-readable medium of claim 11, further comprising instructions for deriving a third spatial filter matrix based on the second spatial filter matrix.

13. An apparatus in a multiple-input multiple-output (MIMO) communication system, comprising:
    means for deriving an initial spatial filter matrix based on a channel response matrix and a selected receiver processing technique; and
    means for performing spatial processing with a spatial filter matrix derived from the initial spatial filter matrix and with different steering matrices to allow a data transmission to observe a plurality of effective channels.

14. The apparatus of claim 13, wherein the data transmission comprises a frame.

15. The apparatus of claim 13, wherein the data transmission comprises a plurality of OFDM symbols.

16. The apparatus of claim 13, further comprising means for determining a spatial filter matrix for each of a plurality of transmission spans within a static range based on a the initial spatial filter matrix, and a steering matrix used for respective transmission spans.

17. The apparatus of claim 13, further comprising means for deriving a second spatial filter matrix based on the initial spatial filter matrix.

18. The apparatus of claim 17, further comprising means for deriving a third spatial filter matrix based on the second spatial filter matrix.

19. An apparatus in a multiple-input multiple-output (MIMO) communication system, comprising:
    a spatial processor configured to derive an initial spatial filter matrix based on a channel response matrix and a selected receiver processing technique, and perform spatial processing with a spatial filter matrix derived from the initial spatial filter matrix and with different steering matrices to allow a data transmission to observe a plurality of effective channels.

20. The apparatus of claim 19, wherein the data transmission comprises a frame.

21. The apparatus of claim 19, wherein the data transmission comprises a plurality of OFDM symbols.

22. The apparatus of claim 19, further comprising a first spatial matrix computation processor configured to determine a spatial filter matrix for each of a plurality of transmission spans within a static range based on the initial spatial filter matrix, and a steering matrix used for respective transmission spans.

23. The apparatus of claim 22, further comprising a second spatial matrix computation processor configured to derive a second spatial filter matrix based on the initial spatial filter matrix.

24. The apparatus of claim 23, further comprising a third spatial matrix computation processor configured to derive a third spatial filter matrix based on the second spatial filter matrix.

25. An apparatus in a multiple-input multiple-output (MIMO) communication system, comprising:
 a module configured to derive an initial spatial filter matrix based on a channel response matrix and a selected receiver processing technique; and
 a module configured to perform spatial processing with a spatial filter matrix derived from the initial spatial filter matrix and with different steering matrices to allow a data transmission to observe a plurality of effective channels.

\* \* \* \* \*